(12) United States Patent
Bidner et al.

(10) Patent No.: US 10,807,436 B2
(45) Date of Patent: *Oct. 20, 2020

(54) METHODS AND SYSTEMS FOR COOLANT SYSTEM

(71) Applicant: Ford Global Technologies, LLC, Dearborn, MI (US)

(72) Inventors: David Karl Bidner, Livonia, MI (US); Hugh Hamilton, Troy, MI (US); James C. Rollinson, Superior Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,506

(22) Filed: Nov. 13, 2018

(65) Prior Publication Data

US 2019/0077214 A1    Mar. 14, 2019

Related U.S. Application Data

(63) Continuation of application No. 15/277,943, filed on Sep. 27, 2016, now Pat. No. 10,124,647.

(51) Int. Cl.
*B60H 1/00* (2006.01)
*F02B 29/04* (2006.01)
(Continued)

(52) U.S. Cl.
CPC ........ *B60H 1/00271* (2013.01); *F01P 3/2285* (2013.01); *F01P 9/06* (2013.01); *F01P 11/16* (2013.01); *F02B 29/0412* (2013.01); *F02B 29/0443* (2013.01); *F02B 29/0493* (2013.01); *B60H 2001/00307* (2013.01); *F01P 2060/02* (2013.01); *F01P 2060/045* (2013.01); *Y02T 10/146* (2013.01)

(58) Field of Classification Search
CPC ........ B60H 1/00271; B60H 2001/3283; B60H 2001/3279; B60H 2001/00307; B60H 1/3211; B60H 1/3227; Y02T 10/146; F02B 29/0425; F02B 29/0493; F02B 29/0412; F02B 29/0443; F16H 41/30; F16H 57/0412; F01P 2050/22; F01P 2060/12; F01P 2060/14; F01P 2007/146; F01P 3/2285; F01P 9/06; F01P 11/16; F01P 2060/02; F01P 2060/045; F01P 3/20; F01P 7/14
USPC .................................. 60/605.1; 62/79, 239
See application file for complete search history.

(56) References Cited

U.S. PATENT DOCUMENTS 3,064,445 A    11/1962    Gerteis
3,113,439 A    12/1963    Eargle
(Continued)

FOREIGN PATENT DOCUMENTS

EP    0736703 A1    10/1996
WO    2007018994 A2    2/2007

*Primary Examiner* — Hoang M Nguyen
(74) *Attorney, Agent, or Firm* — Geoffrey Brumbaugh; McCoy Russell LLP

(57) ABSTRACT

Methods and systems are provided for controlling coolant flow through parallel branches of a coolant circuit including an AC condenser and a charge air cooler. Flow is apportioned responsive to an AC head pressure and a CAC temperature to reduce parasitic losses and improve fuel economy. The flow is apportioned via adjustments to a coolant pump output and a proportioning valve.

20 Claims, 12 Drawing Sheets

(51) Int. Cl.
*F01P 3/22* (2006.01)
*F01P 9/06* (2006.01)
*F01P 11/16* (2006.01)

(56) References Cited

U.S. PATENT DOCUMENTS

| | | | |
|---|---|---|---|
| 4,373,663 | A | 2/1983 | Hammer |
| 5,251,453 | A | 10/1993 | Stanke et al. |
| 5,301,514 | A | 4/1994 | Bessler |
| 5,319,963 | A | 6/1994 | Benford |
| 5,408,843 | A | 4/1995 | Lukas et al. |
| 5,975,031 | A | 11/1999 | Bartolazzi |
| 6,029,345 | A | 2/2000 | Christensen |
| 6,269,650 | B1 | 8/2001 | Shaw |
| 6,427,640 | B1 | 8/2002 | Hickey et al. |
| 6,449,969 | B1 | 9/2002 | Fujimoto et al. |
| 6,862,892 | B1 | 3/2005 | Meyer et al. |
| 8,497,607 | B2 | 7/2013 | Chamberlin et al. |
| 8,544,292 | B2 | 10/2013 | Masters et al. |
| 8,583,290 | B2 | 11/2013 | Campbell et al. |
| 8,806,882 | B2 | 8/2014 | Bennion et al. |
| 9,145,858 | B2 | 9/2015 | Maceroni et al. |
| 9,682,685 | B2 | 6/2017 | Ulrey et al. |
| 10,093,147 | B2 * | 10/2018 | Bidner .................. F01P 3/2285 |
| 10,124,647 | B2 * | 11/2018 | Bidner ............... B60H 1/00271 |
| 2001/0001982 | A1 | 5/2001 | Khelifa et al. |
| 2005/0016193 | A1 | 1/2005 | Tarasinski et al. |
| 2005/0288150 | A1 | 12/2005 | Hitch et al. |
| 2007/0065691 | A1 * | 3/2007 | Maier .................. F04D 27/001 429/436 |
| 2008/0041046 | A1 * | 2/2008 | Bering ..................... F01N 5/02 60/320 |
| 2010/0005822 | A1 | 1/2010 | Bering et al. |
| 2010/0281901 | A1 | 11/2010 | Kawase et al. |
| 2011/0167843 | A1 | 7/2011 | Ueda et al. |
| 2013/0002446 | A1 | 1/2013 | Smith et al. |
| 2014/0250929 | A1 | 9/2014 | Takahashi et al. |
| 2014/0251239 | A1 | 9/2014 | Richards et al. |
| 2015/0040874 | A1 | 2/2015 | Isermeyer et al. |
| 2015/0047374 | A1 | 2/2015 | Ulrey et al. |
| 2015/0059367 | A1 | 3/2015 | Emo et al. |
| 2015/0066263 | A1 | 3/2015 | Abihana |
| 2015/0129160 | A1 | 5/2015 | Burk |
| 2017/0349030 | A1 * | 12/2017 | Miura .................... B60K 11/02 |
| 2018/0087450 | A1 | 3/2018 | Karnik et al. |
| 2018/0087451 | A1 * | 3/2018 | Bidner ................ F02B 29/0493 |
| 2018/0087452 | A1 * | 3/2018 | Bidner ................ B60H 1/3208 |

\* cited by examiner

METHODS AND SYSTEMS FOR COOLANT SYSTEM

CROSS REFERENCE TO RELATED APPLICATION

The present application is a continuation of U.S. patent application Ser. No. 15/277,943, entitled "METHODS AND SYSTEMS FOR COOLANT SYSTEM," filed on Sep. 27, 2016, now U.S. Pat. No. 10,124,647. The entire contents of the above-referenced application are hereby incorporated by reference in its entirety for all purposes.

FIELD

The present application relates to methods and systems for controlling a flow of coolant through multiple engine components.

BACKGROUND AND SUMMARY

Vehicle systems may include multiple coolant loops for circulating coolant through distinct sets of engine components. The coolant flow may absorb heat from some components (thereby expediting cooling of those components) and transfer the heat to other components (thereby expediting heating of those components). For example, a high temperature coolant loop may circulate coolant through an engine to absorb waste engine heat. The coolant may also receive heat rejected from one or more of an EGR cooler, an exhaust manifold cooler, a turbocharger cooler, and a transmission oil cooler. Heat from the heated coolant may be transferred to a heater core (for heating a vehicle cabin), and/or dissipated to the atmosphere upon passage through a radiator including a fan. As another example, a low temperature coolant loop may circulate coolant through a charge air cooler. When required (such as when cabin air conditioning is requested), coolant in the low temperature loop may be additionally pumped through the condenser of an air conditioning (AC) system to absorb heat rejected at the condenser by a refrigerant of the AC system. Heat from the heated coolant may be dissipated to the atmosphere upon passage through another radiator including a fan. One example of such a vehicle coolant system is shown by Ulrey et al. in US20150047374. Another example coolant system is shown by Isermeyer et al. in US20150040874. Therein a heat exchanger enables heat exchange between a charge air cooling coolant circuit and a refrigerant circuit of the condenser.

However, the inventors herein have identified potential issues with such coolant systems. As one example, in vehicle systems where the AC system is configured to provide maximum cooling at all times, fuel economy may be lost due to the need to operate the coolant pump continuously. In addition, the pump may suffer from excess wear resulting in warranty issues. Even during steady-state conditions, the pump output may be higher than required.

Another potential issue is the position of the AC system with relation to other under-hood components. The AC condenser may be positioned at the front end of the vehicle, in front of other under-hood components, allowing a larger portion of vehicle cooling air to be directed to the condenser. However in the event of a vehicle collision, refrigerant may be lost from the condenser due to this location. This can result in additional warranty issues. On the other hand, if the AC condenser were moved further away from the front end of the vehicle to reduce such losses, the condenser may receive a smaller portion of the vehicle cooling air at the new location. Consequently there may be an increase in the need for coolant pumping through the condenser. Also, the under-hood temperature may vary from a steady-state temperature, requiring additional coolant to be pumped to carry away the under-hood heat and operate the AC system at equilibrium.

In one example, the above issues may be addressed by a method for operating a vehicle air conditioning system, comprising: adjusting, via a pump and a proportioning valve coupled to each of a charge air cooler and an air conditioner condenser, a flow of coolant through the condenser in which refrigerant different from the coolant flows, the adjusting in response to a charge air cooler coolant temperature and an actual head pressure of an air conditioner compressor. In this way, AC performance can be improved without degrading fuel economy.

As an example, each of a condenser of an AC system and a CAC may be coupled to distinct branches of a coolant circuit downstream of a proportioning valve, coolant directed into the circuit via a coolant pump. The condenser may be further coupled to a refrigerant circuit of the AC system, while the coolant circuit may be further coupled to an oil circuit of a transmission at a transmission oil cooler. The AC condenser may be positioned towards a rear end of the under-hood area. During vehicle operation, as driver demand and cabin cooling demand changes, the apportioning of coolant flow to each branch may be varied. For example, when the cooling demand of both the AC and the CAC loops is not saturated, based on the cooling demand of the AC loop, a desired coolant temperature is determined. This includes a relatively lower coolant temperature when cabin cooling demand is higher and a relatively higher coolant temperature when there is no cooling demand. Then, by referring a 2D map or model that maps a relationship between the coolant flow rate, the desired coolant temperature, and an AC head pressure, taking into account parasitic losses, a target coolant flow rate may be determined (as the point of minima of the asymptote of the 2D map). In particular, there may be a coolant flow rate above which the change in coolant temperature is not significant due to an increase in parasitic losses at the CAC. This coolant flow rate may be set as the desired coolant flow rate through the AC loop. For example, a minimum coolant flow rate may be determined when no cabin cooling is required. In addition, a corresponding reference AC head pressure may be determined. The desired coolant flow rate is then provided in a feed-forward manner via a combination of pump output adjustment and proportioning valve adjustment while taking into account constraints of other loops and other system components. Based on feedback regarding an error between the actual AC head pressure and the reference AC head pressure, it may be determined if the AC condenser is working harder than required or not, and accordingly the flow may be further adjusted. For example, if the AC is working harder than expected, coolant flow through the AC loop may be increased by increasing the opening of the valve towards the AC loop.

In this way, coolant flow may be apportioned to different components to meet their cooling demands in a fuel efficient manner. By adjusting the flow through each loop responsive to AC head pressure (instead of temperature), changes in cooling demand can be met more promptly, improving cooling response times. In addition, AC efficiency and stress can be better estimated, and compensated for. By relying on the AC head pressure for AC clutch control also, the need for additional sensors is reduced. By sharing the coolant between various components having distinct cooling demands, the need for additional radiators and fans is reduced. This allows the AC components to be placed in a rearward location of the under-hood area which reduces warranty issues without compromising cooling abilities. Overall, engine cooling performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
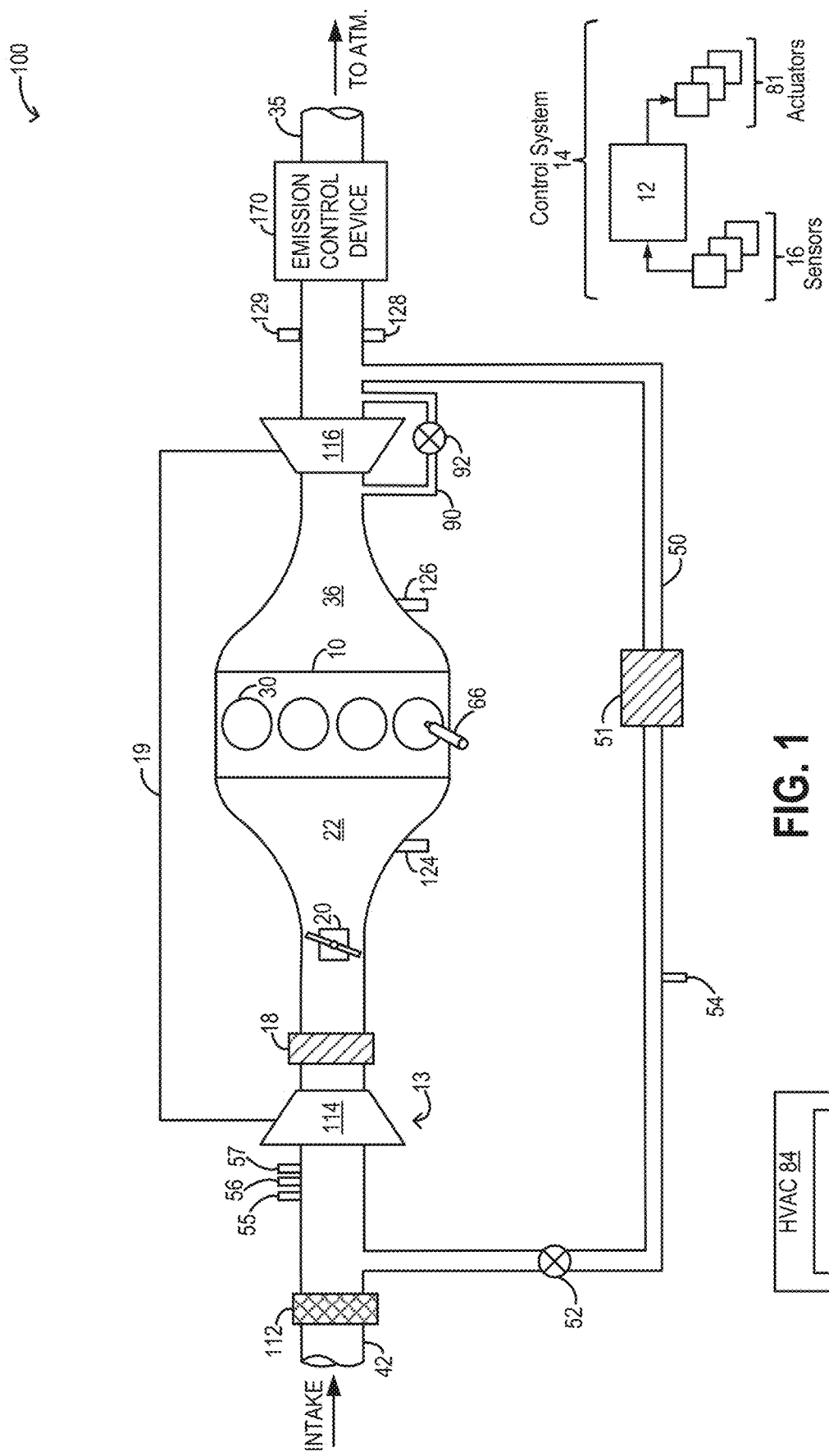
FIG. 1 shows an example embodiment of a boosted engine system.
Figure 2:
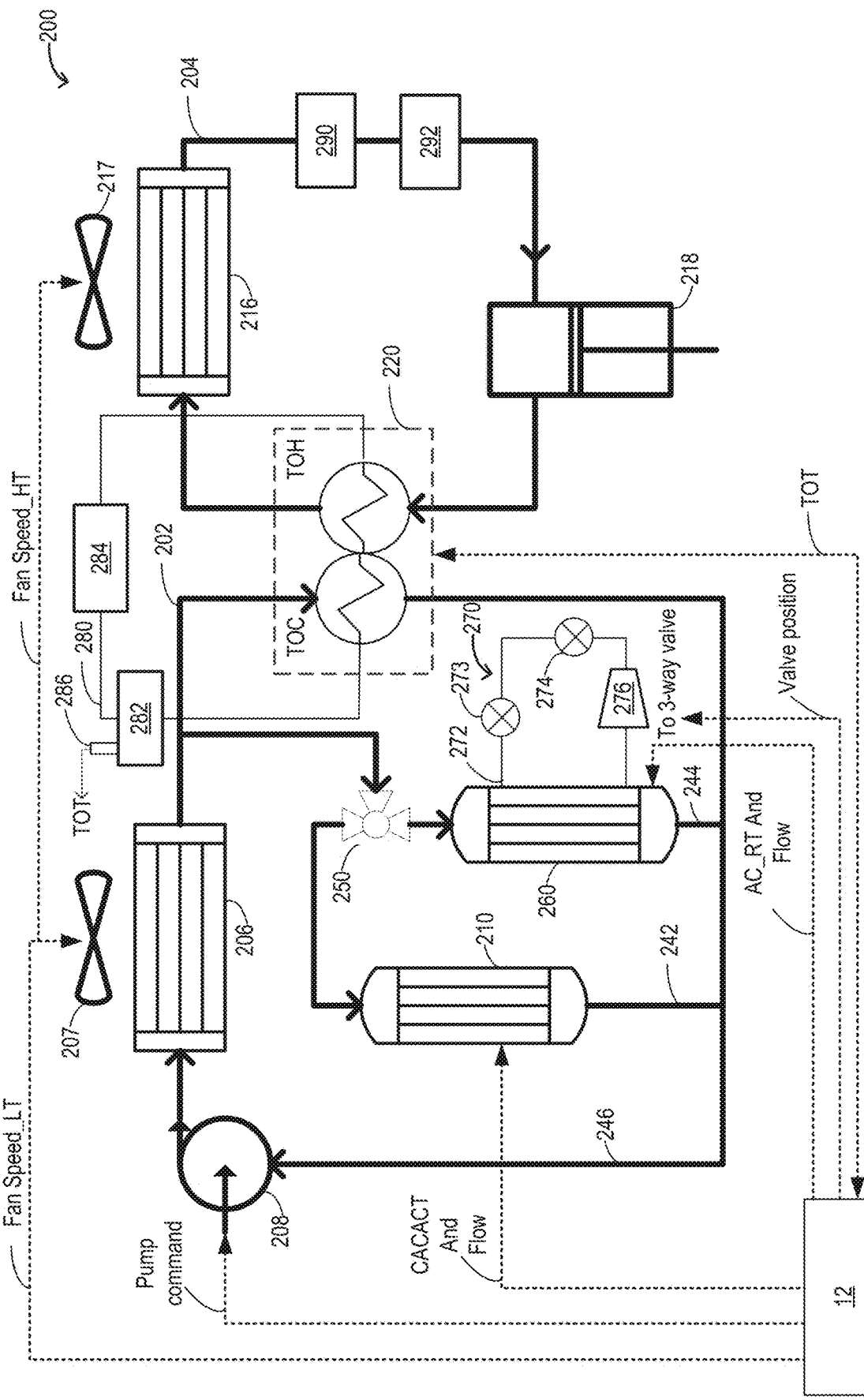
FIG. 2 shows an example embodiment of a coolant system coupled to the engine system of FIG. 1.
Figure 3:
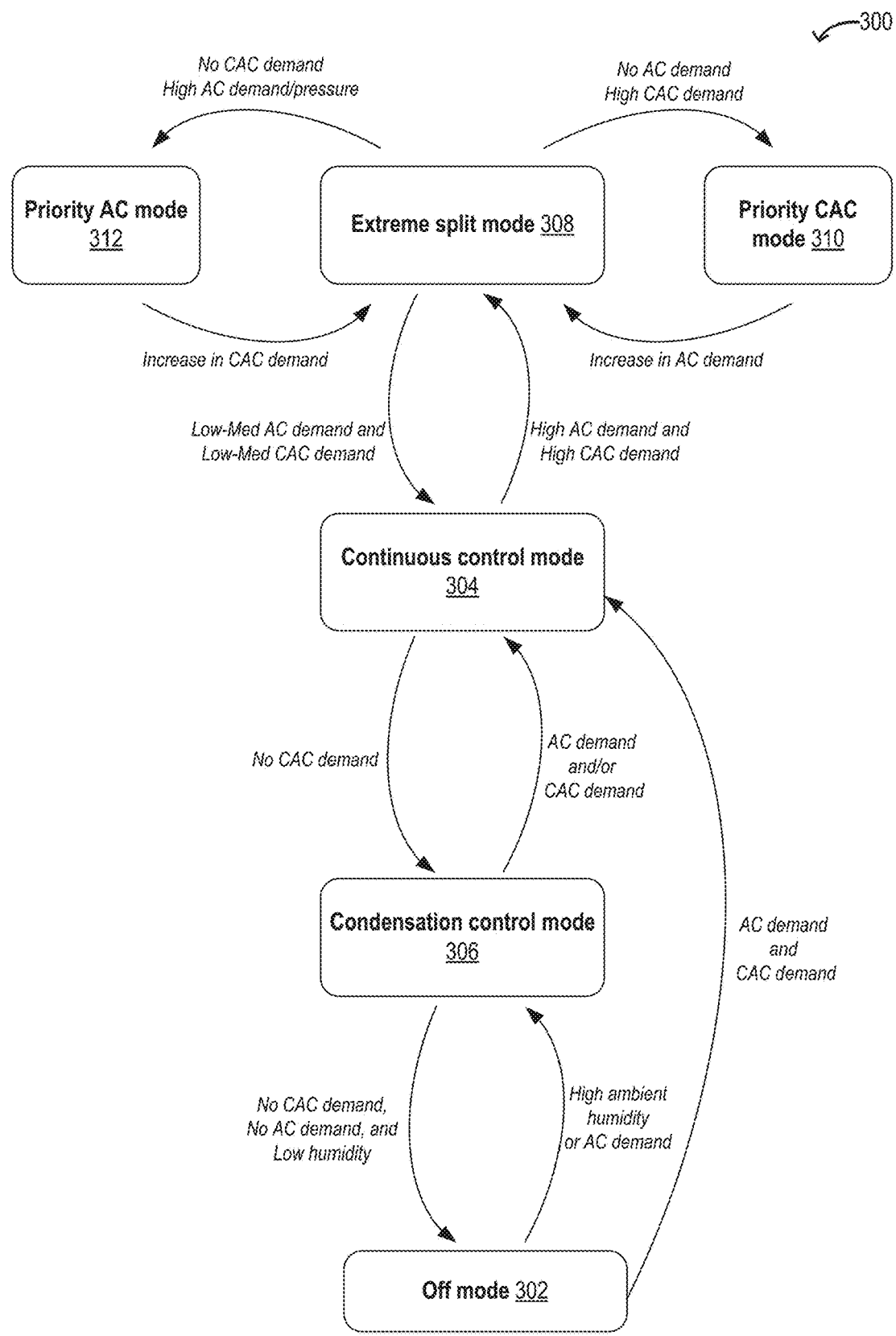
FIG. 3 shows a state diagram depicting the different operating modes of the coolant system.

Methods and systems are provided for improving the performance of components cooled by an engine coolant system, such as the coolant system of FIG. 2 coupled to the engine system of FIG. 1. The coolant system may be operated in one of a plurality of operating states, the coolant system transitioned between the different states responsive to engine operating conditions and changes in cooling demand (as shown at FIG. 3). An engine controller may be configured to perform a control routine, such as the example routine of FIGS. 4-5, to coordinate adjustments to a coolant pump output and the position of a proportioning valve to vary a flow of coolant through the various components of the coolant system to meet cooling demand with reduced parasitic losses. For example, the controller may refer to a map, such as the example maps of FIGS. 6A-6B, to determine a pump output and a coolant flow rate where air conditioning performance is optimized. In addition, the controller may adjust the proportion of coolant flowed through a transmission oil cooler in the coolant loop based on torque converter slip. Example adjustments are shown with reference to FIGS. 9-12. In addition, the controller may use differences between an expected AC head pressure and an actual AC head pressure to diagnose AC system degradation, as described with reference to FIG. 7.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, however, the compressor is a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 114 is coupled, through charge-air cooler (CAC) 18 (herein also referred to as an intercooler) to throttle valve 20. Throttle valve 20 is coupled to engine intake manifold 22. From the compressor, the compressed air charge flows through the charge-air cooler 18 and the throttle valve to the intake manifold. The charge-air cooler may be an air-to-air heat exchanger, for example. A detailed description of the cooling circuit coupled to the CAC is provided below with reference to FIG. 2. In the embodiment shown in FIG. 1, the pressure of the air charge within the intake manifold is sensed by manifold air pressure (MAP) sensor 124. Since flow through the compressor can heat the compressed air, a downstream CAC 18 is provided so that boosted intake aircharge can be cooled prior to delivery to the engine intake.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when EGR is enabled, the sensors may estimate a temperature, pressure, humidity, and air-fuel ratio of the aircharge mixture including fresh air, recirculated compressed air, and exhaust residuals received at the compressor inlet.

Engine system 100 may further include an air conditioning (AC) system 82, for example, as part of a vehicle HVAC system 84. The AC system 82 may include various components such as a compressor for pumping refrigerant, an evaporator for evaporating refrigerant, a condenser for condensing refrigerant, and various temperature sensors. The AC system may be engaged or operated in response to an operator request for vehicle cabin cooling, dehumidification of cabin air, and/or for defrosting. As elaborated herein, when the AC system is engaged, heat generated by AC system operation (specifically at the AC system condenser) may be rejected into a (first) coolant-based cooling circuit coupled to the CAC, the HVAC system, and a radiator, the first cooling circuit not coupled to the engine manifold, cylinder head, or an EGR cooler. In particular, the condenser may be used to reject the heat, while the AC evaporator absorbs the heat that is generated due to AC operation. Overall, the AC system transforms heat into work (Q_evap+

W_mech). The exhaust manifold, cylinder head, and EGR cooler may be coupled to another coolant-based cooling circuit (e.g., another high temperature coolant circuit) instead. Additionally, the engine oil may be cooled and warmed by the high temperature coolant circuit. By adjusting the output of a pump of the first cooling circuit as well as a proportioning valve, coolant flow through the AC system and the CAC may be apportioned based on their cooling demands with reduced parasitic losses to the system and improved fuel economy. In addition, cooling circuit and CAC temperature control may be expedited while reducing overheating. In particular, an AC head pressure is determined for the AC system the AC head pressure being a pressure of the AC system at a location downstream of the AC compressor and upstream of an expansion valve. As such, this is a pressure on the "high side" of the AC system, located after the compressor and generally prior to the condenser. As elaborated herein, the AC head pressure is used in the control of the air cooled AC system for clutch, variable displacement compressor, and fan control.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, bypassing the turbine. In particular, wastegate actuator 92 may be actuated open to dump at least some exhaust pressure from upstream of the turbine 116 to a location downstream of the turbine via wastegate 90. By reducing exhaust pressure upstream of the turbine, turbine speed can be reduced, which in turn helps in boost control. The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NOx from the exhaust flow when the exhaust flow is lean, and to reduce the trapped NOx when the exhaust flow is rich. In other examples, an exhaust after-treatment catalyst may be configured to disproportionate NOx or to selectively reduce NOx with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, a portion of the exhaust residuals may be diverted instead to EGR passage 50, through EGR cooler 51 and EGR valve 52, to the inlet of compressor 114. As such, EGR passage 50 couples the engine exhaust manifold, downstream of the turbine 116, with the engine intake manifold, upstream of compressor 114.

EGR valve 52 may be opened to admit a controlled amount of cooled exhaust gas to the compressor inlet for desirable combustion and emissions-control performance. In this way, engine system 10 is adapted to provide external, low-pressure (LP) EGR by tapping exhaust gas from downstream of turbine 116. EGR valve 52 may also be configured as a continuously variable valve. In an alternate example, however, EGR valve 52 may be configured as an on/off valve. The rotation of the compressor, in addition to the relatively long LP-EGR flow path in engine system 10, provides excellent homogenization of the exhaust gas into the intake air charge. Further, the disposition of EGR take-off and mixing points provides very effective cooling of the exhaust gas for increased available EGR mass and improved performance. In further embodiments, the engine system may further include a high pressure EGR flow path wherein exhaust gas is drawn from upstream of turbine 116 and recirculated to the engine intake manifold, downstream of compressor 114.

EGR cooler 51 may be coupled to EGR passage 50 for cooling EGR delivered to the compressor. In addition, one or more sensors may be coupled to EGR passage 50 for providing details regarding the composition and condition of the EGR. For example, a temperature sensor may be provided for determining a temperature of the EGR, a pressure sensor may be provided for determining a temperature of the EGR, a humidity sensor may be provided for determining a humidity or water content of the EGR, and an air-fuel ratio sensor 54 may be provided for estimating an air-fuel ratio of the EGR. Alternatively, EGR conditions may be inferred by the one or more temperature, pressure, humidity and air-fuel ratio sensors 55-57 coupled to the compressor inlet. An opening of the EGR valve may be adjusted based on the engine operating conditions and the EGR conditions to provide a desired amount of engine dilution.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and EGR sensor 54. Other sensors such as additional pressure, temperature, air/fuel ratio, and composition sensors may be coupled to various locations in engine system 100. The actuators 81 may include, for example, throttle 20, EGR valve 52, a compressor recirculation valve, wastegate 92, and fuel injector 66. The control system 14 may include a controller 12. The controller may receive input data from the various sensors, process the input data, and trigger various actuators in response to the processed input data based on instruction or code programmed therein corresponding to one or more routines. Example control routines are described herein with regard to FIGS. 4, 5, and 7.

Now turning to FIG. 2, an example cooling system 200 coupled to the engine of FIG. 1 is shown. As such, the engine may be coupled to a passenger vehicle or other road vehicle. The cooling system enables defrost heat recovered from operation in a defrost mode to be passed on to a CAC so as to expedite engine heating. Specifically, flow through the warmed CAC is used to restrict coolant cooling, allowing the air from the compressor which is already hot and conduction/convection from the engine to warm the air, improving engine performance during cold conditions.

Coolant system 200 includes a first coolant circuit or loop 202 and a second coolant circuit or loop 204, each coupled to different sets of engine system components. First coolant circuit 202 constitutes a low temperature coolant loop including low temperature (LT) radiator 206 and associated fan 207, coolant pump 208, a water-air charge air cooler (CAC) 210, and AC system condenser 260. Coolant pump 208 may be a variable output electric pump driven by an electric motor. First coolant circuit 202 further includes a proportioning valve 250 which in the depicted example is configured as a three-way valve. In addition, a transmission oil cooler (TOC) 220 is coupled to the first coolant circuit. AC system condenser 260 may be coupled to air conditioning system 270 that is part of a larger vehicle HVAC system (such as the AC system of FIG. 1). The AC system 270 may include a refrigerant circuit 272 that circulates refrigerant through the AC system to provide cooling via the compression and expansion cycles of the refrigerant, the refrigerant circuit 270 interfacing with the coolant circuit at the condenser 260. The refrigerant circuit may include a thermal expansion valve 272, an AC clutch 274, and an AC compressor 276. The expansion valve is configured to control the amount of refrigerant that flows into the condenser, thereby controlling the superheat at the outlet of the evaporator. The thermal expansion valve thereby functions as a metering device of the AC system. The AC clutch is configured to control the flow of refrigerant from the AC compressor. In this way, each of refrigerant and coolant may circulate through the AC condenser.

TOC 220 includes cooler and a heater for regulating a temperature of transmission oil flowing there-through. A transmission oil circuit 280 may be coupled to each of first coolant loop 202 and second coolant loop 204 at the TOC. The transmission oil circuit 280 flows oil drawn from oil sump 282 through a transmission 284. A temperature sensor 286 coupled to the transmission circuit, such as at the oil sump, provides an estimate of the transmission oil temperature (TOT) to controller 12. TOT may be used as an input by controller 12 to vary the output of pump 208 and also vary the apportioning of coolant via adjustments to the position of proportioning valve 250. By exchanging heat with coolant circuits 202, 204, a temperature of oil at the transmission can be maintained within a threshold, optimizing transmission performance. The heat dissipated into the oil at the transmission can be advantageously used for engine heating. Likewise, heat dissipated into the coolant circuit via the engine can be advantageously used to warm the transmission oil, and thereby heat the engine.

During conditions when there is a cooling demand at the AC condenser (such as when the AC system is engaged during a request for cabin cooling or defrosting), or a cooling demand at the CAC (such as when the engine intake compressor is operating), or a cooling demand at the transmission oil cooler (TOC) (such as when the temperature of transmission oil is higher than a threshold), coolant pump 208 may be operated to flow coolant into circuit 202. In addition, the position of proportioning valve 250 is adjusted to vary the flow rate of coolant through the different circuit components based on their respective cooling demands. For example, proportioning valve 250 may be adjusted to direct a first amount of coolant into a first sub-loop 242 including CAC 210, a second amount of coolant into second sub-loop 244 including AC condenser 260, and a remaining, third amount of coolant into the main loop 246 including TOC 220. As elaborated herein, by adjusting an output of pump 208 in coordination with adjusting the position of proportioning valve 250, a coolant flow rate through each component may be adjusted to meet respective cooling demands while reducing parasitic losses at the pump and improving overall engine fuel economy.

The desired coolant flow rate for the AC condenser may be set according to the measured coolant temperature. The desired coolant flow rate may be a flow rate that corresponds to minimum parasitic losses as determined during mapping and calibration. The flow rate may be further adjusted based on the difference between the expected AC head pressure and the actual AC head pressure. The desired coolant flow rate in all the branches is then passed to an inverse hydraulic model that sets the proportioning valve position and coolant pump speed to obtain the required flow rate. In this way, the minimum pump flow rate is achieved given the branch-specific flow requirements and total flow requirements.

Figure 6A:
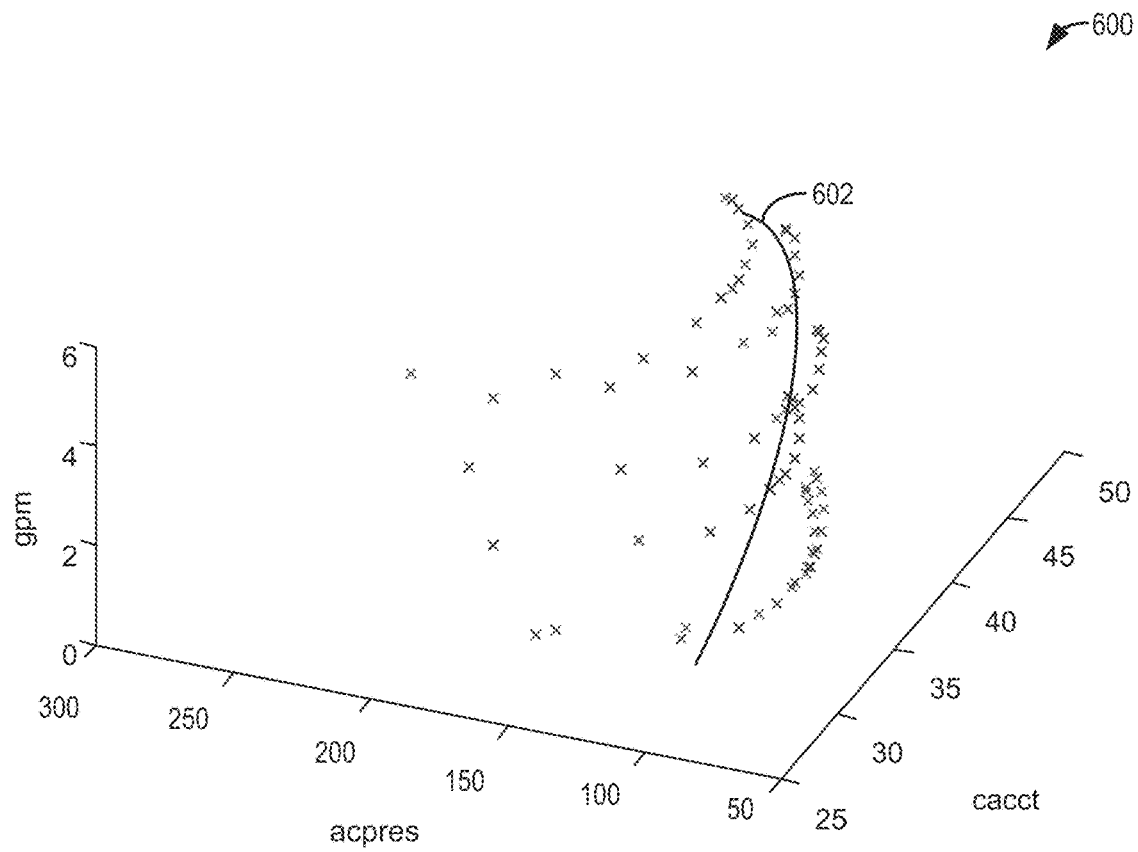
FIGS. 6A-6B show example maps depicting the relationship between coolant pump output, AC head pressure, and coolant flow rate.
Figure 6B:
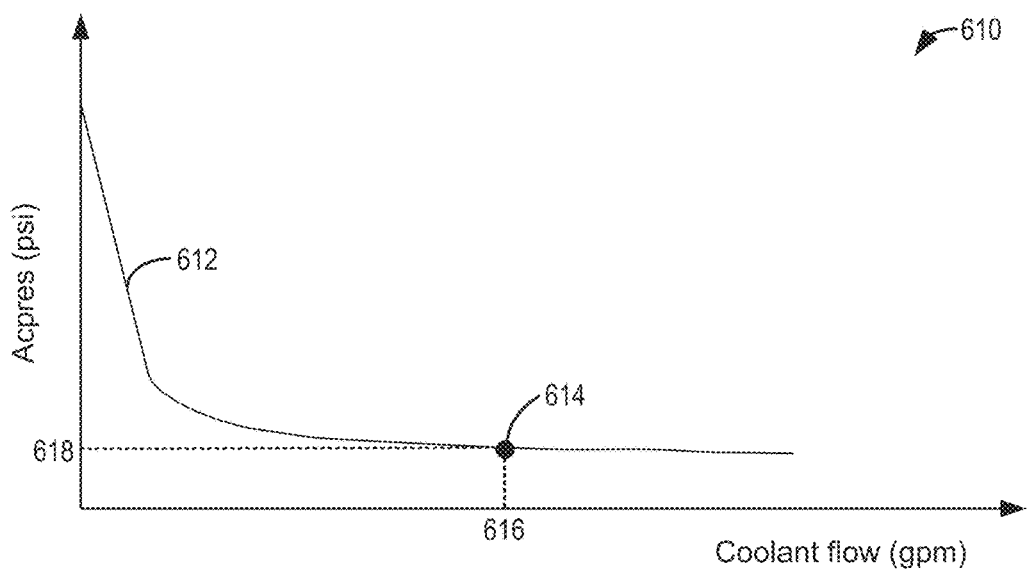

For example, during conditions when there is CAC cooling demand, AC cooling demand, and TOC cooling demand, and none of the cooling demands are saturated, the coolant system may be operated in a continuously controlling mode wherein flow through each loop is determined based on feed-forward and feedback components. For example, coolant flow through the CAC loop may be feed-forward determined based on air mass flow (e.g., MAF, measured downstream of the CAC) and CAC coolant temperature (at the inlet to the CAC). The first feed-forward value of the AC head pressure may be inferred from CAC coolant temperature. The feed-forward value of coolant flow may be further based on TCT (upstream air flow into the CAC), and feedback adjusted based on manifold charge temperature (MCT). As an example, if the MCT is higher than a target temperature, more coolant is flowed to cool it down. As another example, if the MCT is cooler than the target temperature, less coolant is flowed to restrict cooling. Likewise, coolant flow through the AC loop may be feed-forward determined based on AC head pressure and feedback adjusted based on the AC head pressure. As an example, if the AC head pressure is higher than a target pressure, more coolant may be flowed through the AC system to cool the AC system and bring down the pressure. As another example, if the AC head pressure is lower than the target pressure, coolant flow through the AC system may be restricted to limit the cooling of the AC system and raise the AC head pressure. Further, coolant flow through the TOC loop may be feed-forward determined based on torque converter slip and feedback adjusted based on transmission oil temperature. As an example, if the transmission is overheating (which can occur frequently in automatic transmission when driving torque is running through an open fluid coupling, such as an open torque converter), coolant flow may be adjusted. The transmission overheating may be indicated by a transmission oil temperature (TOT). Thus, as the TOT increases, the amount of coolant flow may be increased. As such, if any of the loops have no cooling demand, for example when there is no demand for air conditioning and coolant flow is not required through the AC loop, coolant flow through that branch may be reduced to a minimum flow. After determining the coolant flow required through each branch, a pump output command may be determined and further a positioning of the proportioning valve may be determined. In one example, if there is no cooling demand at all branches, coolant flow may be delivered to each branch at a minimum flow rate, and the pump may be operated at a minimum speed. This enables the cooling to be rapidly increased when the cooling demand subsequently increases (such as in response to a sudden demand for air conditioning). FIG. 6A shows a 3D map of the relationship between optimal coolant flow rate, CACCT coolant temperature, and AC head pressure. FIG. 6B shows a 2D slice of the map of FIG. 6A and point 614 corresponds to a point on the optimal curve 602 of FIG. 6A, showing an optimal flow rate a specific CACCT coolant temperature, and the corresponding reference AC head pressure (ACPRES). With a minimal flow, the coolant temperature available to a transient or even a demand can be quickly known, speeding the delivery of accurate cooling flow. Additionally, if flow is stagnated in any branch, the risk of boiling over is present, which is addressed by adjusting to provide the minimal flow. It will be appreciated that stagnating of coolant flow is undertaken only under specific well quantified conditions.

In first cooling circuit 202, coolant pump 208 is configured to pump hot coolant received from condenser 260 and CAC 210 into radiator 206 so that heat can be rejected to the environment. Specifically, ambient air may flow through radiator 206, picking up heat rejected at the radiator. CAC 210 may be configured to cool compressed intake aircharge received from a compressor before the aircharge is delivered to the engine intake. During boosted engine operation, intake air compressed at a compressor is delivered to the engine upon passage through the CAC (such as CAC 18 of FIG. 1). Heat from the air is rejected into coolant flowing the CAC.

When cooling demand at CAC 210 is saturated, proportioning valve 250 is adjusted by an engine controller to a position such that coolant pump 208 operation forces more coolant along first sub-loop 242 and diverts coolant away from AC condenser 260 and TOC 220. In comparison, when the cooling demand at AC condenser 260 is saturated, proportioning valve 250 is adjusted by the engine controller to a position such that coolant pump 208 operation forces more coolant along second sub-loop 244 and diverts coolant away from CAC 210 and TOC 220. In this way, valve 250 affects the TOC flow due to the valve resistance varying over its travel.

In still other examples, when the cooling demand at each of the CAC and the AC is saturated, the pump output and the proportioning valve position may be adjusted to share the available coolant while meeting the cooling demand of each component. For example, when both demands are saturated, the coolant system may be operated in an extreme mode wherein the pump output is set to a maximum output (e.g., a maximum speed) and the proportioning valve is set to a position that provides a calibrated split of coolant flow between the AC and the CAC. In one example, the calibrated split includes each of the AC and the CAC receiving 50% of the coolant flow. For example, if the sum of the AC and the CAC demand is more flow than the system can provide, the controller may set the pump to a maximum setting (fully on) and apportion the branch flows as per a predetermined split of the resource, such as by setting the valve at 50% (towards the CAC) (see for example "extreme mode 308 of FIG. 3).

As another example, if there is no AC demand (AC is off) and the CAC demand is greater than what the system can provide (such as when racing on a track), the valve is set to 100% (which includes 100% flow towards the CAC) (see for example "priority CAC mode 310 at FIG. 3). As yet another example, if the AC head pressure (ACPRES) is higher than a threshold (e.g., critically high) and the CAC load is low, the valve may be set to 5% (which includes 5% flow towards CAC and the remaining f95% flow towards the AC) (see for example, "priority AC mode 312" of FIG. 3). Thus, the coolant pump output goes to both the AC condenser, the CAC, and the TOC, and the output of each of the AC condenser, the CAC, and the TOC mixes at the inlet of the pump. As a result, when the engine is not boosted, hotter coolant comes out of the condenser and colder coolant would come out of the CAC to be mixed into warm coolant at the pump inlet.

Second cooling circuit 204 constitutes a high temperature circuit and includes high temperature radiator 216 and associated fan 217, and engine block 218. In addition, transmission oil cooler (acting also as a transmission oil heater) 220 may be coupled at the interface of coolant circuit 202 and coolant circuit 204. An engine-driven mechanical coolant pump may be coupled to engine block 218 for pumping coolant through high temperature (HT) coolant circuit 204. Additional components coupled to HT circuit 204 may include an EGR cooler, a heater core, a turbocharger cooler 290 and an exhaust manifold cooler 292.

Second cooling circuit 204 is a traditional coolant loop and circulates coolant through internal combustion engine 218 to absorb waste engine heat and distribute the heated coolant to radiator 216 and/or the heater core. Radiator 216 may include a radiator fan 217 to improve the efficiency of cooling. The second cooling circuit may also circulate coolant through an EGR cooler coupled to the EGR system (of FIG. 1). Specifically, exhaust heat is rejected at EGR cooler during EGR delivery. The second cooling circuit also circulates coolant through and receives heat rejected from transmission oil cooler 220 and a turbocharger.

It will be appreciated that while the depicted configuration shows specific components coupled to the first, low temperature (LT) cooling circuit and other components coupled to the second, high temperature (HT) cooling circuit, this is not meant to be limiting. In alternate examples, selection of components for the HT or LT cooling circuit may be based on convenience in routing, and/or location of components relative to one another in the engine system. In one example, the AC condenser, the CAC, a diesel fuel cooler component (when included) may be provided coupled to the LT circuit since these components may be more effective in the LT coolant circuit due to the lower temperatures experienced there, as well as to bring down the LT coolant circuit to ambient temperature.

The engine-driven water pump circulates coolant through passages in engine block 218, specifically, through the intake and exhaust manifolds, through the engine head, and then through engine block to absorb engine heat. From the engine, coolant flows back to the engine upon passage through EGR cooler and radiator 216. Heat is transferred via radiator 216 and fan 217 to ambient air. Thus, during conditions when EGR is delivered, heat rejected at EGR cooler can be circulated through engine 218 and advantageously used to warm the engine, such as during cold ambient conditions. Engine-driven water pump may be coupled to the engine via a front end accessory drive (FEAD, not shown), and rotated in proportion with engine speed via a belt, chain, etc. In one example, where the pump is a centrifugal pump, the pressure (and resulting flow) produced may be proportional to the crankshaft speed, which in the example of FIG. 2, is directly proportional to engine speed. An auxiliary pump may also be included in the second cooling circuit to assist coolant flow through the EGR system and the turbocharger. The temperature of the coolant may be regulated by a thermostat valve which may be kept closed until the coolant reaches a threshold temperature.

Fans 207, 217 may be coupled to radiators 206, 216, respectively in order to maintain an airflow through the radiators when the vehicle is moving slowly or stopped while the engine is running. In some examples, fan speed may be controlled by a controller. Alternatively, fan 217 may be coupled to the engine-driven water pump. Further still, in some examples, heat exchangers 206 and 216 may be packed close together so that a single fan can be used to pull air through both heat exchangers.

Hot coolant may also flow to the heater core via an auxiliary pump. An auxiliary pump may be employed to circulate coolant through heater core during occasions when engine 218 is off (e.g., electric only operation) and/or to assist engine-driven pump when the engine is running. Like engine-driven pump, the auxiliary pump may be a centrifugal pump; however, the pressure (and resulting flow) produced by the auxiliary pump may be proportional to an amount of power supplied to the pump by a system energy storage device (not shown).

The coolant system of FIG. 2 may be operated in one of a plurality of modes, and may be transitioned between the modes based on engine operating conditions. A state diagram 300 of the different possible modes and conditions triggering a transition between the modes is depicted at FIG. 3.

For example, the coolant system may be in an off mode 302 wherein the electric pump of the first cooling circuit is shut off and the proportioning valve is adjusted to a position to close off coolant flow to each of the AC system and the CAC. In this way, more of the coolant flow can be directed away from the AC and CAC loops, and more coolant flow can be directed through the main loop. As another example, in response to vehicle racing without cabin cooling, the coolant system may be transitioned to a priority CAC mode 310 wherein the pump output is increased and the proportioning valve is positioned to prioritize flow to the CAC. The AC system may be transitioned to a continuous control mode 304 wherein the pump and valve are controlled via the previously described control strategy in order to meet the cooling demands of all the devices. As another example, in response to turbocharger outlet temperature being higher than available coolant temperature and the condensation temperature of the inlet air is at a threshold humidity content and pressure, the coolant system may be transitioned to a condensation control mode 306 wherein the proportioning valve is adjusted to a position where the flow is controlled using the pump and valve to minimize or eliminate the condensation created in the intake. As yet another example, in response to both a high AC and CAC demand, where both cannot be fully met even using the full output of the pump the coolant system may be transitioned to an extreme split mode 308 wherein the electric pump of the first cooling circuit is fully on (at a maximum output) and the proportioning valve is adjusted to a position to where coolant flow to each of the AC system and the CAC is apportioned by a predetermined amount, such as at 50% towards CAC and 50% towards AC system, or 45% towards CAC and 55% towards AC system. The fixed ratio includes a higher ratio of coolant flow through the condenser relative to the charge air cooler. From the extreme mode, in response to a higher than threshold AC head pressure and a lower than threshold CAC load, such as when there is no longer a CAC cooling request present and the AC cooling request is high enough to saturate the pump (e.g., more cooling than can be provided), the coolant system may be transitioned to a priority AC mode 312 wherein the electric pump of the first cooling circuit is fully on (operating at a highest output) and the proportioning valve is adjusted to a position to maximize coolant flow to the AC system (e.g., valve setting at 100% towards AC system). Alternatively, in response to higher than threshold CAC demand (that is when the CAC is at the maximum available cooling capacity) with no cabin cooling demand (such as when racking around a track), the coolant system may be transitioned to a priority CAC mode 310 wherein the electric pump of the first cooling circuit is fully on (operating at a highest output) and the proportioning valve is adjusted to a position to maximize coolant flow to the CAC (e.g., valve setting at 100% towards CAC).

Figure 4:
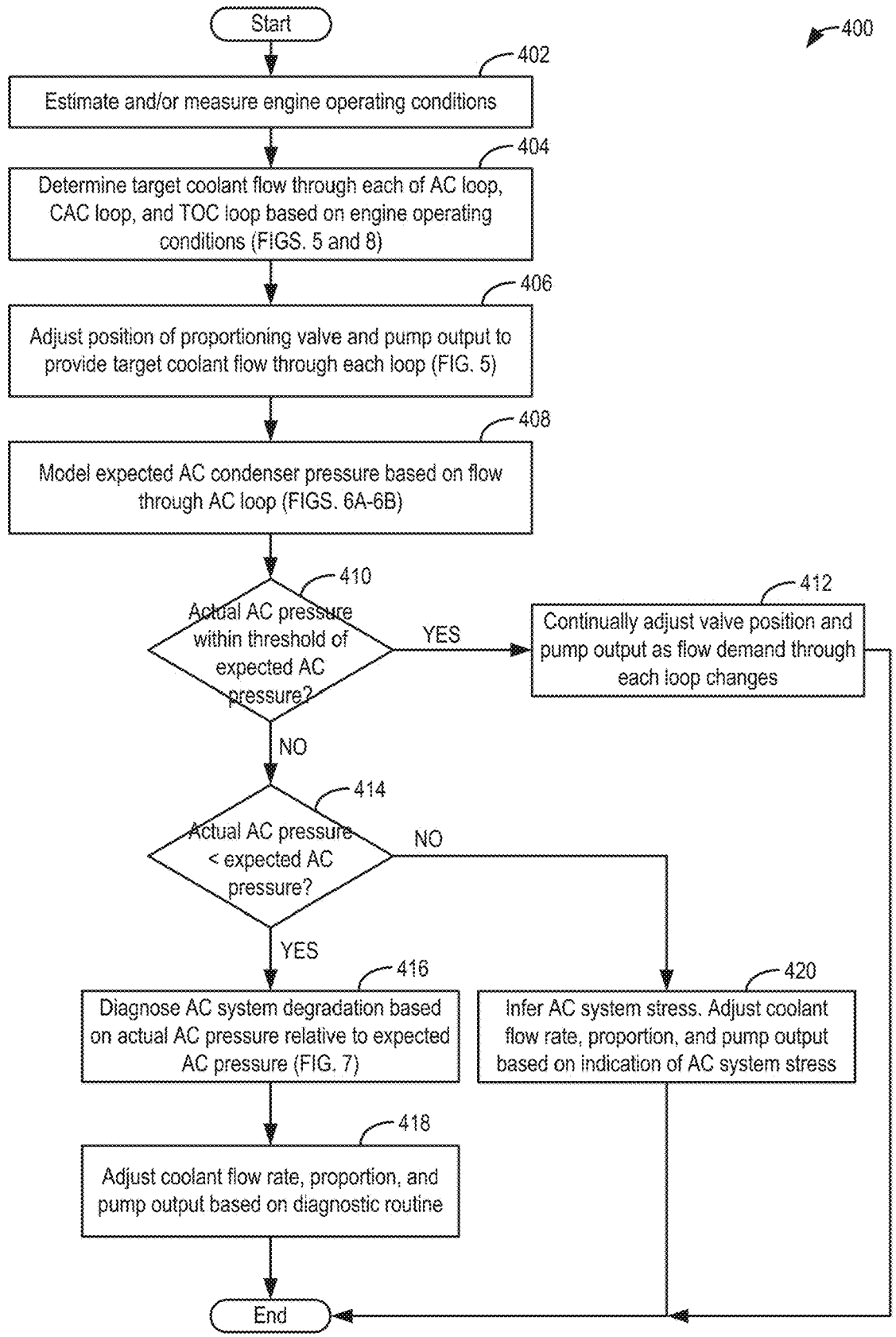
FIG. 4 shows a high level flow chart illustrating a routine that may be implemented for operating the coolant system based on cooling demand and engine operating conditions.

Turning now to FIG. 4, an example routine 400 is shown for adjusting the operation of an engine coolant system, such as the coolant system of FIG. 2, to meet the cooling demand of engine components while reducing parasitic losses and improving fuel economy. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, based on one or more of an AC head pressure, a CAC temperature, and a transmission oil temperature, an engine controller may vary the output of an electric pump and adjust a position of the proportioning valve of the low temperature circuit of the coolant system.

At 402, the method includes estimating and/or measuring engine operating conditions. For example, the controller may determine engine speed, engine load, driver demand, boost pressure, MAP, MAF, CAC temperature, cabin cooling demand, engine temperature, engine oil temperature, transmission oil temperature, etc.

At 404, the method includes determining a target coolant flow through each component of the coolant system. For example, the controller may calculate a target (desired) coolant flow through each of the AC sub-loop, CAC sub-loop, and TOC loop of the first coolant circuit. As elaborated at FIG. 5, the coolant flow desired through each loop may be determined based on the cooling demand of each component, as well as a priority factor based on engine operating conditions. In one example, the controller may refer to a map, such as the example map of FIG. 6A and/or FIG. 6B to determine the coolant flow required through the AC loop to maintain a given AC head pressure at a given CAC coolant temperature. Therein, point 614 corresponds to the desired feed-forward coolant flow of point 616. If the ACPRES is higher than the reference pressure (point 618), then more coolant is added to the feedback flow resulting a net greater flow than at point 616.

For example, to determine the required coolant flow for optimal fuel economy, with the pump operating at a steady state speed and with the AC coolant flow at a maximum, the controller may sweep coolant flow rate and ambient temperature to calculate the total parasitic losses. In particular, the map of FIG. 6A is used for mapping and calibration. By referring to the map of FIGS. 6A and 6B, the controller may determine the lowest parasitic loss flow for a given CAC coolant temperature (CACCT), as measured at the outlet of the low temperature heat exchanger). The controller may use curve 602 and a function of CACCT, ideal/target AC head pressure (ACPRES_ideal), and target/ideal coolant flow for coolant flow control. The estimated lowest parasitic losses may be set as the open loop base flow rate through the AC loop. A corresponding reference AC head pressure for the given CACCT may also be determined from the map and used as the reference pressure for closed loop control of coolant flow through the AC loop. A gain term Kp may then be determined based on an error between the actual measured AC head pressure and the reference/expected AC head pressure. The gain term and the error may be used for a closed-loop correction of the coolant flow rate through the AC loop.

In one example, the open loop control of coolant flow through the AC loop may be triggered on in response to the AC being turned on and/or a request for cabin cooling being received. In response to the demand for air conditioning, the controller may measure the coolant temperature available to the AC condenser in the low temperature coolant circuit. Then, the controller may look-up the desired optimal coolant flow rate based on the measured temperature where fuel economy losses are minimum, such as by referring to map 600 of FIG. 6A. Else, if there is no demand for air conditioning, the controller may turn off the open loop control of coolant flow through the AC loop. Therein, the controller may measure the coolant temperature available to the AC condenser in the low temperature coolant circuit and then look-up a desired AC off coolant flow rate in order to precondition the AC for the next time it is turned on. These loops may then run continuously for improving AC efficiency. By maintaining a small (lower threshold amount) of coolant flow even when the AC system is not in use, the AC condenser may be pre-positioned in terms of temperature for the next demand request. Likewise, by maintaining a small (lower threshold amount) of coolant flow even when the AC system is not in use, during start/stop conditions when the residual AC pressure is bleeding down, the AC may be prepositioned in terms of pressure and temperature for the next engine start and compressor start.

At 406, based on the coolant flow desired through each component, an output of the electric coolant pump may be adjusted in coordination with a position of the proportioning valve. As elaborated with reference to FIG. 5, the pump and the proportioning valve may be controlled based on CAC temperature and AC head pressure to meet the cooling demands. For example, when there is an increase in driver demanded torque and boost pressure (such as during vehicle acceleration), it may be determined that CAC cooling has to be prioritized and pump output may be adjusted to provide a desired coolant flow rate while the proportioning valve is adjusted to deliver a bulk of the coolant to the CAC loop. As another example, when cabin cooling demand increases, it may be determined that AC cooling has to be prioritized and pump output may be adjusted to provide a desired coolant flow rate while the proportioning valve is adjusted to deliver a bulk of the coolant to the AC loop. In still other examples, when transmission oil temperature (TOT) increases, it may be determined that TOC cooling has to be prioritized and pump output may be adjusted to provide a desired coolant flow rate while the proportioning valve is adjusted to deliver a bulk of the coolant to the TOC loop.

At 408, an expected AC head pressure may be modeled based on the coolant flow through the AC loop. In particular, the AC head pressure may be determined as a function of the CACCT temperature of the coolant out of the low temperature radiator, the coolant flow through the CAC, and engine output. As an example, the controller may refer a 3D map, such as the example map of FIG. 6A, to model the expected AC head pressure. As used herein, the AC head pressure refers to the pressure of AC system downstream of the AC compressor and upstream of the expansion valve, that is, on the high side of the AC system. The inventors herein have recognized that the AC head pressure is more responsive to thermal stress on the AC condenser as compared to the AC temperature, and particularly the evaporator temperature. By using the AC head pressure to determine the coolant flow, coolant flow can be changed more quickly in response to changes in cooling demand.

FIGS. 6A-6B show mapping data at a series of steady state points from which the base steady state optimal operating coolant flow and expected AC head pressure for reference can be determined. These are then compared to the actual AC head pressure to infer how hard the system is working (that is, the coefficient of performance, or COP). This parameter is used as an indication for correcting the coolant flow rate. In particular, as the difference between the actual and the expected AC head pressure increases, and thereby as the COP increases, a larger correction of coolant flow rate is required to more quickly return the system to the optimum/most efficient point. The COP is negatively affected by increased AC head pressure, which implies that the compression work is increased for a given cooling load. Additionally, COP is negatively affected by parasitic losses in the coolant pump (thus an optimal steady state flow).

In addition, by using the same AC head pressure for AC clutch control, AC performance is improved. In particular, if the AC head pressure is above a threshold (normal) range but the AC compressor is not at risk due to the higher pressure, the AC clutch is maintained engaged and the coolant flow is increased to the maximum rate the pump can deliver. However, if the coolant flow is still not high enough and the AC head pressure is further increasing to the point where compressor damage can occur, the AC clutch is opened up.

Map 600 depicts a 3D map 610 of change in AC head pressure with coolant flow (in gpm) and charge air cooler coolant temperature (CACCT). As coolant temperature (in the low temperature coolant circuit) rises, the AC head pressure rises. Also, as the coolant flow rate increases, AC head pressure drops. At a constant coolant temperature, the AC head pressure approaches an asymptote (also see FIG. 6B). Thus, a big increase in coolant flow rate results in a small AC pressure reduction. Parasitic losses may be learned as the sum of AC compressor losses and coolant pump losses in watts. As coolant flow increases, parasitic losses drop, and then increase. The minimum AC pump parasitic loss occurs at a coolant temperature that can be mapped using map 610.

For example, the CACCT is measured, and the corresponding optimal coolant flow rate and expected AC head pressure are derived from two separate but coordinated functions of CACCT. These functions are carried in the control system and FIGS. 6A-6B are used to populate these functions:

AC_Pressure_ref=2D_table(CACCT_coolant temperature);

Base_AC_coolant_flow=2D_table(CACCT_coolant temperature).

Returning to FIG. 4, at 410, it may be determined if the actual AC head pressure is at or within a threshold of the expected AC pressure. If yes, then at 412, the method includes continually adjusting each of the proportioning valve position and electric coolant pump output as flow demand through each loop changes.

If not, at 414, the method includes determining if the actual head pressure is lower than the expected pressure. If yes, then at 416, AC system degradation may be diagnosed based on the actual AC pressure relative to the expected pressure. As elaborated with reference to FIG. 7, an engine controller may diagnose a cause of the pressure drop and differentiate between a pressure drop caused due to component degradation (such as AC condenser pump degradation), refrigerant loss from the AC system, and the presence of a pinched line. At 418, based on the indication of AC system degradation, a coolant flow rate and a proportion of coolant flow through the AC may be updated.

If the actual head pressure is higher than the expected pressure, at 420 the controller may infer AC system stress. For example, it may be determined that the AC efficiency has dropped and that the AC condenser is working thermodynamically harder than required, for example due to under-hood temperature fluctuations. In particular, as the vehicle comes to a stop, air flow through the radiator and under the hood is reduced. This causes the temperature of all the components under the hood to gradually rise, including coolants and refrigerants. This results in the need for increased coolant flow to achieve the same cooling function that could be achieved at higher vehicle speeds (e.g., at 20 mph) with less coolant. Accordingly, based on the indication of AC system stress, a coolant flow rate and a proportion of coolant flow through the AC may be updated. For example, the pump output may be decreased and the coolant flow through the AC may be increased so as to lower the AC head pressure. The routine then exits.

In one example, the controller may use an "Inverse" hydraulic model that takes desired flows into account and determines the device settings in accordance. In the hydraulic approach, branch resistance and viscosity may be accounted for. Essentially, the 3-way proportioning valve is adjusted based on the proportioning of flow in the branches. After branch resistance effects are accounted for, the flow is summed and this is used to determine the pump command. Both the pump and the valve may go through a "hardware characteristic compensation" to allow for changes to hardware. The two continuously variable flow devices (the electric pump and the 3-way proportioning valve) are adjusted such that the branch flow requests are met exactly and a minimum parallel branch flow is met. This results in the electric pump operating at the minimum pump setting and with parasitic losses minimized while still meeting the required cooling. By adding several functions, a single model (described below) may be configured by calibration for a variety of actual hydraulic configurations.

As discussed with reference to FIG. 2, the low temperature loop of the coolant system has at least three devices that require coolant flow: the charge air cooler, the water cooled AC condenser and the transmission oil cooler. The circuit has two continuous actuators, the pump and the 3-way (diverter/proportioning) valve. The transmission oil cooler itself has an on/off switch. The hydraulic circuit separates valve-controlled coolant customers from the rest of the coolant system. As such, other components on the other loop could be valve controlled, however this loop is for low temperature cooling customers. In particular, the output from the LT radiator is shared between three different customers, namely the water-cooled AC condenser, the charge air cooler and the automatic transmission cooler (or warm-up unit, herein also referred to as ATWU). The customers are in parallel to each other, but are in series with the coolant pump and the radiator. The valve controlled customers are grouped together into the valve controlled path. Each branch is then thought of as having a smaller virtual pump to provide that branch's flow. When combining the virtual pumps flows, one may obtain the actual desired singular big pump setting. Conceptually, the total flow requirement for the valve controlled path is provided using the (big) virtual pump, whereas the valve is used to proportion the flow between the devices grouped in the control path. Thus, the valve controls the flow split between the CAC and the AC, then the controller checks to ensure that the TOC minimum flow rate is met. The TOC flow rate is then controlled by the pump.

In the discussed approach, electric circuit analogy is used to analyze the coolant system. The pump is considered equivalent to a voltage source, which is true for impeller pumps such as ones in the coolant system. The flow in individual branches are considered equivalent to (and denoted as) current,$I_{()}$, and the flow resistances in individual devices are denoted by $R_{()}$. The subscripts denote the name of the customer or device (with "rad" referring to the LT radiator, "cac" referring to the charge air cooler, "pump" referring to the electric coolant pump, "atwu" referring to the transmission oil cooler, and "cond" referring to the AC condenser). Applying voltage and current laws, we get the following equations:

$$V = I_{pump}(R_{rad}+R_{pump}) + I_{atwu}R_{atwu}$$

$$V = I_{pump}(R_{rad}+R_{pump}) + I_{cac}R_{cac}$$

$$V = I_{pump}(R_{rad}+R_{pump}) + I_{cond}R_{cond}$$

$$I_{pump} = I_{atwu} + I_{cac} + I_{cond}$$

The above equations can then be used to eliminate the current in the ATWU and the pump flow rate. The resulting relationships are:

$$I_{atwu} = \frac{I_{cac}+I_{cond}}{\frac{1}{R_{cac}}+\frac{1}{R_{cond}}} \frac{1}{R_{atwu}} \tag{1}$$

$$I_{cac} = \frac{I_{cac}+I_{cond}}{\frac{1}{R_{cac}}+\frac{1}{R_{cond}}} \frac{1}{R_{cac}} \quad I_{cond} = \frac{I_{cac}+I_{cond}}{\frac{1}{R_{cac}}+\frac{1}{R_{cond}}} \frac{1}{R_{cond}} \tag{2}$$

$$I_{pump} = \frac{I_{cac}+I_{cond}}{\frac{1}{R_{cac}}+\frac{1}{R_{cond}}}\left(\frac{1}{R_{cac}}+\frac{1}{R_{cond}}+\frac{1}{R_{atwu}}\right)$$

$$V = \frac{I_{cac}+I_{cond}}{\frac{1}{R_{cac}}+\frac{1}{R_{cond}}}\left(\frac{1}{R_{cac}}+\frac{1}{R_{cond}}+\frac{1}{R_{atwu}}\right) \tag{3}$$

$$\left(\frac{1}{\frac{1}{R_{cac}}+\frac{1}{R_{cond}}+\frac{1}{R_{atwu}}} + R_{rad}+R_{pump}\right)$$

The resistances in the two branches of the valve controlled path are not independent, rather, they depend upon primarily the valve position, $u_v$. Considering the system nonlinearities, these resistances could also possibly depend upon the flows in the two branches. For the most general case, the resistances can be characterized as follows:

$$\frac{\frac{1}{R_{cac}}}{\frac{1}{R_{cac}} + \frac{1}{R_{cond}}} = f_v\{u_v, I_{cac}, I_{cond}\}, \quad (4)$$

$$\frac{1}{R_{cac}} + \frac{1}{R_{cond}} = \frac{1}{R_{v,eq}} = f_{v,Req}\{u_v, I_{cac}, I_{cond}\}. \quad (5)$$

Equation (4) relates to the fraction of flow through the CAC branch (or the priority branch) and the second equation relates to the equivalent resistance of the valve controlled path, $R_{v,eq}$.

In order to relate the resistances to the current through each branch, we define the fraction of flow through the valve that goes through one of the branches. This fraction is also related to the flow resistances of the two branches. The relationship for the fraction of flow through CAC is given by $$x_v = \frac{I_{cac}}{I_{cac} + I_{cond}} = \frac{\frac{1}{R_{cac}}}{\frac{1}{R_{cac}} + \frac{1}{R_{cond}}} \quad (6)$$

The pump potential, V, depends upon the pump speed input, $u_p$, and the flow resistance of the circuit. One can imagine that the pump potential or flow for a given speed is a result of the intersection of the pump characteristics and the flow resistance curves of the circuit.

$$I_{pump} = \frac{V}{\left(\frac{1}{\frac{1}{R_{cac}} + \frac{1}{R_{cond}} + \frac{1}{R_{atwu}}} + R_{rad} + R_{pump}\right)} = \quad (7)$$

$$f_{pump}\left\{u_p, \left(\frac{1}{\frac{1}{R_{cac}} + \frac{1}{R_{cond}} + \frac{1}{R_{atwu}}} + R_{rad} + R_{pump}\right)\right\}$$

The control inputs, $u_p$ and $u_v$ can be determined using Equations (1) to (4) if the following are known:
1. Requested values for $I_{cac}$ and $I_{cond}$
2. Relationship between the flow faction and the valve position $f_v\{u_v, I_{cac}, I_{cond}\}$
3. Equivalent resistance of the valve controlled path $f_{v,Req}\{u_v, I_{cac}, I_{cond}\}$
4. Resistance in the ATWU path
5. Resistances in the pump and radiator parts of the circuit are known
6. Resolved relationship between the characteristics and the circuit flow resistance $f_{pump}$ In a first case, relating to the pump, the equivalent resistances may be independent of the valve position, that is $f_{v,Req}\{u_v, I_{cac}, I_{cond}\}=R_{v,eq}$, a constant. Reformulating the problem of controlling flows into the CAC and COND branch as controlling the total flow through the valve controlled branches $I_{cac}+I_{cond}=I_{v,total}$, we get $$u_p = \quad (8)$$

$$f_{pump}^{-1}\left\{I_{v,total}R_{v,eq}\left(\frac{1}{R_{v,eq}} + \frac{1}{R_{atwu}}\right), \left(\frac{1}{\frac{1}{R_{v,eq}} + \frac{1}{R_{atwu}}} + R_{rad} + R_{pump}\right)\right\}$$

In a second case, relating to the valve, the resistances in the individual branches are not dependent upon the absolute values of $I_{cac}$ and $I_{cond}$. $f_v\{u_v, I_{cac}, I_{cac}\}=\bar{f}_v\{u_v\}$.

$$u_v = \bar{f}_v^{-1}\left\{\frac{I_{cac}}{I_{cac} + I_{cond}}\right\} \quad (9)$$

In the present scenario, there is one parallel path which affects the relationship between the pump flow and the flow through the valve controlled circuit. Based on Equation (2), there is a relationship between the total flow through the valve controlled path and the pump flow. Using the equivalent resistance and the total valve flow variables we can simplify the equation as:

$$I_{pump} = \frac{I_{v,total}}{\frac{1}{R_{v,eq}}}\left(\frac{1}{R_{v,eq}} + \frac{1}{R_{atwu}}\right) \quad (10)$$

If the transmission cooler circuit is closed, there is no airflow through the ATWU branch and hence $I_{pump}=I_{total}$. Thus the resultant relationship between the pump command and the total flow through the valve is given is given by $$u_p=f_{pu}^{-1}\{I_{v,total}(R_{v,eq}+R_{rad}+R_{pump})\} \quad (11)$$

Thus opening or closing of the ATWU part of the circuit affects the overall circuit resistance, and hence the relationship between the flow through the 3-way valve and pump command.

In one example of a constrained condition, the requested total valve flow may exceed the flow available at the branch. This may occur if the flow requested is such that the pump is commanded at its maximum value $u_p^{max}=1$, yet the flow at the valve is less than the total flow requirement. Alternatively, this may occur if the pump commanded value is limited by a customer/device other than the valve controlled path. It can be ($u_p^{max}<1$)

If the pump is set to $u_p^*$, then the expected flow through the valve can be characterized using Equation (5) and the relationship between pump and valve flow rates as:

$$I_{v,total}^{max} = \quad (12)$$

$$\frac{\frac{1}{R_{v,eq}}}{\left(\frac{1}{R_{v,eq}} + \frac{1}{R_{atwu}}\right)} f_{pump}\left\{u_p^{max}, \left(\frac{1}{\frac{1}{R_{v,eq}} + \frac{1}{R_{atwu}}} + R_{rad} + R_{pump}\right)\right\}$$

In this scenario, the priority customer has its requirements met, whereas the remaining flow is diverted to the other customer. This is addressed by defining a new term, as revised condenser flow (non-priority path flow). The expected flow through the branch is given by:

$$I_{v,total}^{exp}=\min\{I_{v,total}^{max}, I_{v,total}\} \quad (13)$$

In this scenario, the priority customer gets its requirements met, whereas the remaining flow is diverted to the other customer. The resulting revised condenser flow (non-priority path flow) would then be $$I_{cond,rev} = I_{v,total}^{exp} - I_{cac} \quad (4)$$

$$\tilde{i}_{cac} = \frac{I_{cac}}{I_{v,total}^{exp}} \quad \tilde{i}_{cond} = \frac{I_{cond,rev}}{I_{v,total}^{exp}}$$

$$u_v = \overline{f}_v^{-1}\left\{\frac{\tilde{i}_{cac}}{I_{v,total}^{exp}}\right\}$$

In another example of a constrained condition, the requested total valve flow may be lower than flow available at the branch. This may be due to the flow requested being such that the pump is commanded at its minimum value $u_p^{min}$, yet the flow at the valve is greater than the total flow requirement. Alternatively, this may occur if the minimum pump commanded value is determined by a customer/device other than the valve controlled path.

For example, if the ATWU demands a certain minimum flow rate, $I_{atwu}^{min}$, a minimum flow demanded ATWU branch can be translated to minimum total flow through the valve controlled path using the above equation. The total flow in the valve controlled path is related to the ATWU through the relationship below.

$$I_{v,total}^{min} = I_{atwu}^{min} \frac{R_{atwu}}{R_{v,eq}} \quad (15)$$

Or, if the pump command has a certain minimum value imposed:

$$I_{v,total}^{min} = \frac{\frac{1}{R_{v,eq}}}{\left(\frac{1}{R_{v,eq}} + \frac{1}{R_{atwu}}\right)} f_{pump}\left\{u_p^{min}, \left(\frac{1}{\frac{1}{R_{v,eq}} + \frac{1}{R_{atwu}}} + R_{rad} + R_{pump}\right)\right\} \quad (6)$$

If this minimum flow request is greater than the total flow, then the requirements of both the paths cannot be met simultaneously. Again, in this case, the valve is set to divert the excess flow to the non-priority path.

$$I_{v,total}^{exp} = \max\{I_{v,total}^{min}, I_{v,total}\}$$

$$I_{cac,rev} = I_{cac} \quad I_{cond,rev} = I_{v,total}^{exp} - I_{cac}$$

$$\tilde{i}_{cac} = \frac{I_{cac,rev}}{I_{v,total}^{exp}} \quad \tilde{i}_{cond} = \frac{I_{cond,rev}}{I_{v,total}^{exp}} \quad u_v = \overline{f}_v^{-1}\left\{\frac{\tilde{i}_{cac}}{I_{v,total}^{exp}}\right\}$$

In another example of a constrained condition, the pump command may be fixed. Then the commanded value may be determined by a customer/device other than the valve controlled path. In this case:

$$I_{v,total}^{exp} = \frac{\frac{1}{R_{v,eq}}}{\left(\frac{1}{R_{v,eq}} + \frac{1}{R_{atwu}}\right)} f_{pump}\left\{u_p^*, \left(\frac{1}{\frac{1}{R_{v,eq}} + \frac{1}{R_{atwu}}} + R_{rad} + R_{pump}\right)\right\} \quad (9)$$

-continued $$I_{cac,rev} = I_{cac} \quad I_{cond,rev} = I_{v,total}^{exp} - I_{cac}$$

$$\tilde{i}_{cac} = \frac{I_{cac,rev}}{I_{v,total}^{exp}} \quad \tilde{i}_{cond} = \frac{I_{cond,rev}}{I_{v,total}^{exp}} \quad u_v = \overline{f}_v^{-1}\left\{\frac{\tilde{i}_{cac}}{I_{v,total}^{exp}}\right\}$$

If there is a change in the priority of the customers in the valve controlled path, the calculation may be reversed with the CAC value recomputed if the priority changes. For example, if the AC was in priority then:

$$I_{cac,rev} = I_{v,total}^{exp} - I_{cond}$$

$$I_{cond,rev} = I_{cond}$$

$$\tilde{i}_{cac} = \frac{I_{cac,rev}}{I_{v,total}^{exp}} \quad \tilde{i}_{cond} = \frac{I_{cond,rev}}{I_{v,total}^{exp}} \quad u_v = \overline{f}_v^{-1}\left\{\frac{\tilde{i}_{cac}}{I_{v,total}^{exp}}\right\}$$

In one example, this may be implemented as a 2D lookup table, the table providing the valve setting. The table may use the full capability of the memory available in the controller. The expected total flow may be used as an input to compensate for nonlinear valve behaviors. The implementation can be hardcoded for a 3-Way valve.

The inputs for the calculation may include requested values for coolant flow through CAC and AC loops. If I_cac and I_cond are normalized flow variables, they should be normalized with the same number, for example the maximum flow through the valve. The controller may also obtain TOC settings (affecting the flow resistance in the path not controlled by the valve). The controller may further obtain the mapping between pump flow and flow through the valve controlled path. The pump command is then determined from total flow through the pump and the resistances in individual branches using the above equations. Total flow at the valve is then mapped into the pump flow. The lookup table may be used if the relationship is significantly nonlinear. The valve position may be used as an input if there is a significant interaction which could create the need for a numerical iteration solution. The tables may be calibrated based upon ATWU settings.

Figure 5:
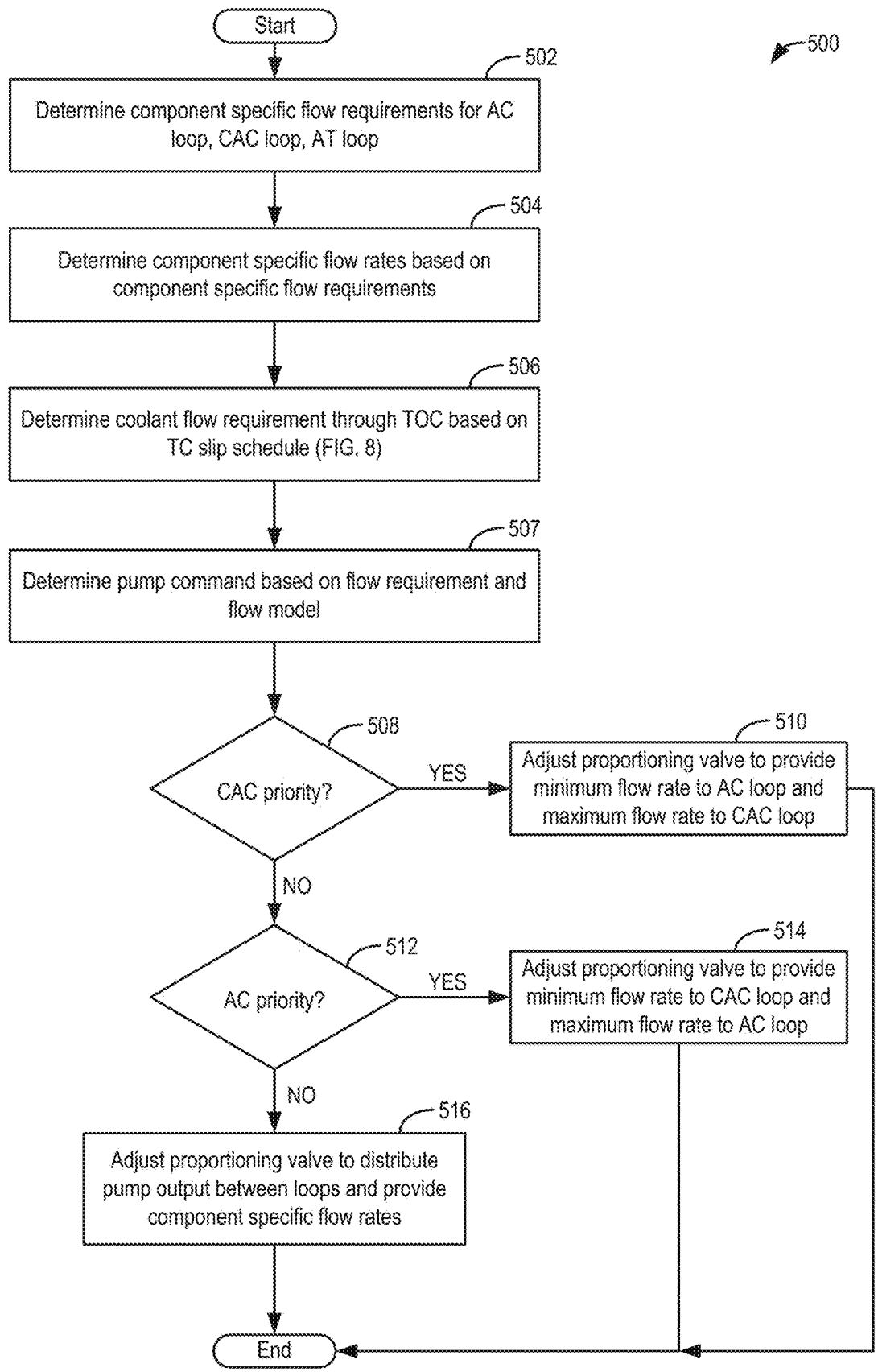
FIG. 5 shows a high level flow chart illustrating a routine that may be implemented for apportioning coolant flow between different engine components.

Turning now to FIG. 5, an example routine 500 is shown for apportioning coolant flow through the different components of a coolant system based on cooling demand. The method enables different cooling demands to be met while prioritizing certain cooling demands over others during selected conditions. This may be required when individual loops have conflicting cooling requirements or the instantaneous cooling requirements for individual loops cannot be met due to capacity limitations.

At 502, the method includes determining component specific flow requirements. For example, an amount of cooling required at each of the AC loop, the CAC loop, and the TOC loop may be determined based on parameters such as MAF, MCT, TCT, CACCT, operator cooling demand, and ambient temperature and humidity estimates. As another example, the AC requirement may depend upon cabin cooling needs while the CAC requirement may depend upon the temperature of the air entering the charge air cooler. In addition, the CAC requirement may vary as the driver demand varies, the CAC requirement increasing when the driver demand increases and boost pressure is required. The increased operation of the intake compressor results in a warmer charge entering the CAC. Determining the cooling requirements may include determining a coolant flow amount, a desired coolant pressure at the component, as well as a desired temperature change at each component. At 504, component specific coolant flow rates may be determined based on the component specific cooling requirements and the component specific flow requirements.

At 506, the coolant flow required through the TOC may be updated based on the slip schedule of the torque converter. As elaborated with reference to FIG. 8, during conditions when the torque converter (TC) is slipping and generating extra heat, the temperature of the transmission oil at the outlet of the TC may be higher than the temperature of the transmission oil at the sump. During these conditions, the coolant flow through the TOC may be adjusted based on an inferred TC temperature instead of the TOT estimated at the sump so as to reduce the likelihood of the temperature being underestimated and coolant flow being underprovided. As such, if the transmission oil temperature is underestimated, coolant boiling can occur. For example, the coolant flow may be determined based on a transmission oil temperature including an estimated transmission oil temperature, estimated via a temperature sensor coupled to an oil sump, when transmission torque converter slip is less than a threshold, the transmission oil temperature including an inferred transmission oil temperature modeled based on torque converter slip when the transmission torque converter slip is above the threshold.

At 507, based on the component specific flow requirements, a pump command may be determined for the electric coolant pump. For example, a pump command may be determined via a flow model, as elaborated herein, that provides the combined flow requirement of each of the components. In one example, a pump setting may be determined as the maximum of the TOC flow requirement, and the CAC and AC condenser flow requirements.

At 508, it may be determined if coolant flow to the CAC needs to be prioritized (herein also referred to as CAC priority). In one example, the CAC may need to be prioritized responsive to a lower than threshold AC cooling demand (e.g., no AC cooling being requested) or a lower than threshold AC head pressure alongside a higher than threshold MCT (resulting from not enough CAC cooling and increased driver demand). If yes, then at 510, the method includes adjusting the proportioning valve to flow coolant through the AC at a minimum flow rate while flowing coolant through the CAC at a maximum flow rate. Additionally, an output of the pump may be increased.

If CAC priority is not confirmed, at 512, it may be determined if coolant flow to the AC needs to be prioritized (herein also referred to as AC priority). In one example, the AC may need to be prioritized responsive to a lower than threshold MCT (resulting from CAC cooling) or a lower than threshold CAC cooling demand (e.g., no CAC cooling being requested) alongside a high AC head pressure. These conditions may be indicative of a need for additional AC cooling. If yes, then at 514, the method includes adjusting the proportioning valve to flow coolant through the CAC at a minimum flow rate while flowing coolant through the AC at a maximum flow rate. Additionally, an output of the pump may be increased.

If neither AC priority nor CAC priority is confirmed, but both have a cooling demand, then at 516, the method includes adjusting a position of the proportioning valve to distribute the pump output between the different loops and sub-loops of the coolant system to provide the component specific flow rates. For example, under extreme cooling load, such as when the vehicle is towing uphill in desert conditions, there may not be enough cooling to operate the AC system either efficiently or at maximum capacity and simultaneously provide adequate cooling with optimal engine performance. At this point, a trade-off is calibrated. The trade-off may be a predetermined and stored in the controller's memory. For example, the calibrated trade-off may include 45% of the coolant flow being directed to the CAC and a remaining 55% of the coolant flow being directed to the AC loop. In this way, a modulation of flow is provided where all minimum flow demands are met.

Figure 7:
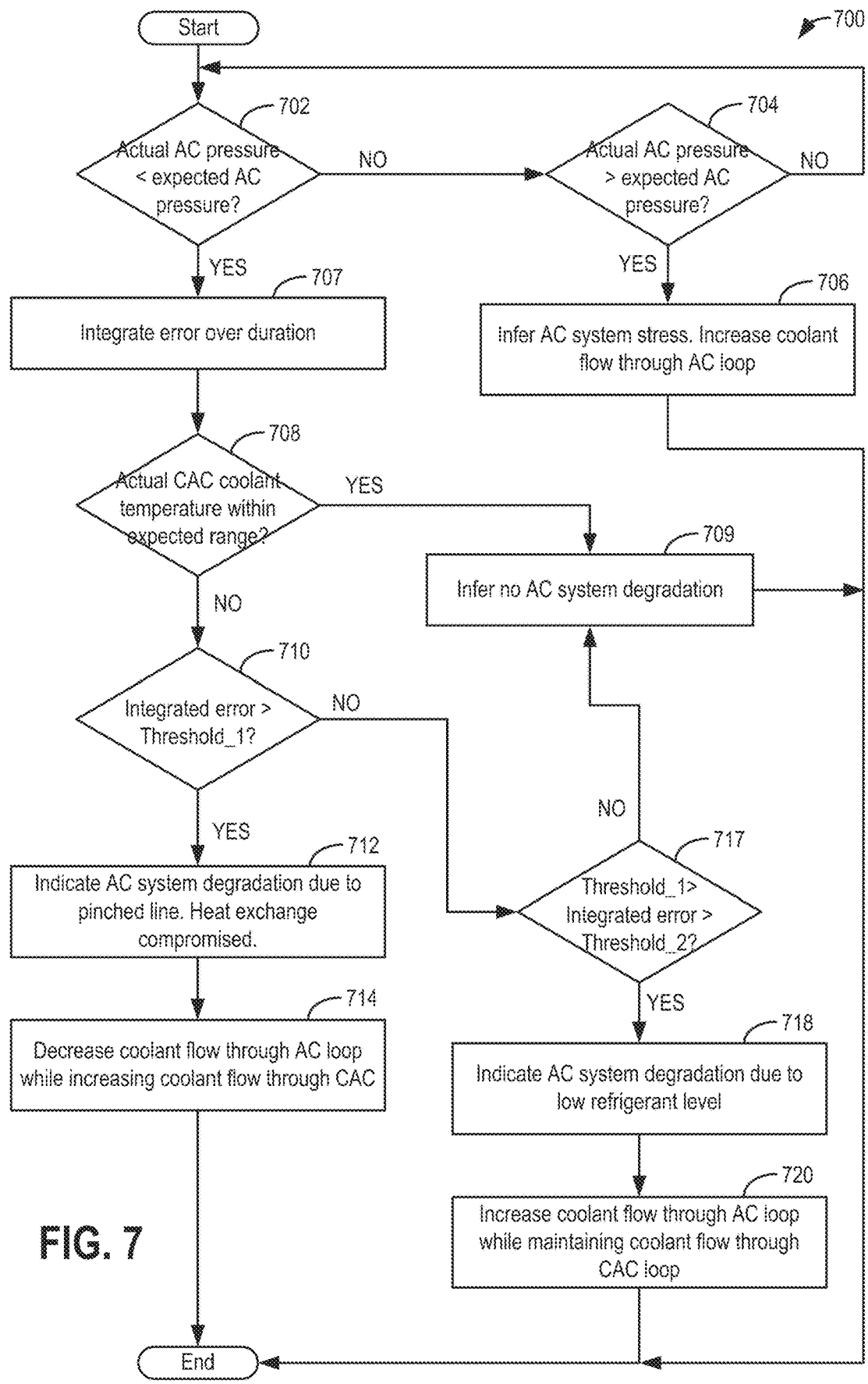
FIG. 7 shows a high level flow chart illustrating a routine that may be implemented for diagnosing AC system degradation.

Turning now to FIG. 7, an example method 700 is shown for diagnosing AC system degradation based on actual AC head pressure relative to expected/modeled AC head pressure (such as modeled using the map of FIG. 6). In one example, the method of FIG. 7 may be performed as part of the method of FIG. 4, such as at 416. The method enables a drop in AC pressure due to a drop in the refrigerant level to be better distinguished from a pinched coolant line.

At 702, the method includes confirming that the actual (measured) AC head pressure is less than an expected (modeled) pressure. The expected pressure is a pressure based on the current CAC coolant temperature of the system. In some examples, in addition to confirming that the AC head pressure is less than the expected pressure, it may be confirmed that the actual pressure remains below the expected pressure over a duration. If not, then at 704, it may be confirmed that the actual head pressure is higher than the expected pressure given the existing CAC coolant temperature of the system. Additionally, one or more thresholds may be established. In some examples, if the pressure is close to the reference pressure (e.g., within a threshold distance of the threshold pressure), then control actions may be pre-emptively undertaken.

At 706, in response to the actual head pressure being higher than the expected pressure, it may be inferred that there is AC system stress due to increased cabin cooling load. For example, it may be determined that the AC system is working harder than expected due to higher cabin temperatures, such as due to higher solar load (or higher ambient temperatures). Accordingly, in response to the indication of AC system stress, coolant flow through the AC loop may be increased by requesting more branch flow to the AC loop and coordinating the pump output and the valve position to deliver the requested branch flow rate. For example, the output of the electric coolant pump and a position of the proportioning valve may be adjusted using the inverse hydraulic model. In one example, the controller may provide the requested increase in coolant flow by increasing pump output by a larger amount and increasing coolant flow through the AC loop by a smaller amount. Alternatively, the controller may provide the same requested increase in coolant flow by increasing pump output by a smaller amount and increasing coolant flow through the AC loop by a larger amount. The controller may compare the fuel economy and time to improvement in AC head pressure in both options and accordingly select a combination. The selection may also factor in the resulting change in CAC flow relative to the CAC coolant flow demand.

Returning to 702, if the actual AC head pressure is lower than expected, then at 707, the error between the actual AC head pressure and the expected pressure may be integrated over the duration. In one example, the duration corresponds to a significant portion of a drive cycle, such as about 700 seconds. At 708, it may be determined if the actual CAC coolant temperature is within an expected range. If yes, then it may be determined that the AC system is not degraded and the routine may end. Alternatively, if the CACCT is within range, then it may be inferred that there is possibly an issue with the AC condenser and if the CACCT is out of range, then that might explain the poor system behavior.

If the actual CAC coolant temperature is outside the expected range, given the existing CAC coolant temperature of the system, then at 710, it may be determined if the integrated error is higher than a first threshold error (Threshold_1). If the coolant temperature is outside the expected range and the integrated error is higher than the first threshold error, then at 712, AC system degradation may be indicated. In particular, it may be indicated that the heat exchanger function of the AC system (e.g., at the condenser) is compromised, for example, due to a pinched line. In addition, at 714, responsive to the indication of a pinched line, coolant flow through the AC loop may be decreased while coolant flow through the CAC loop is correspondingly increased without significant CAC effect other than overcooling.

If the actual CAC coolant temperature is outside the expected range given the existing CAC coolant temperature of the system, and the integrated error is not higher than the first threshold error, then at 717, it may be determined if the integrated error is higher than a second threshold error (Threshold_2), smaller than the first threshold error (Threhsold_1). If not, the routine returns to 709 to indicate no AC system degradation and routine ends. Else, if the actual CAC coolant temperature is outside the expected range given the existing CAC coolant temperature of the system, and the integrated error is higher than the second threshold error (but lower than the first threshold error), then at 718, it may be indicated that there is an AC system degradation due to low refrigerant levels. For example, the low refrigerant level may be due to the presence of a leak, such as may occur due to loose fittings. At 720, in response to the indication of low refrigerant levels, coolant flow through the AC loop may be increased while maintaining coolant flow through the CAC loop to provide AC performance although the AC system is determined to be degraded. In particular, coolant flow is decreased to save pump electrical power. Since the AC system is determined to be degraded, the cooling by the AC has no effect from the reduced pump output. In particular, AC performance is not adversely affected by a reduced pump output.

Figure 8:
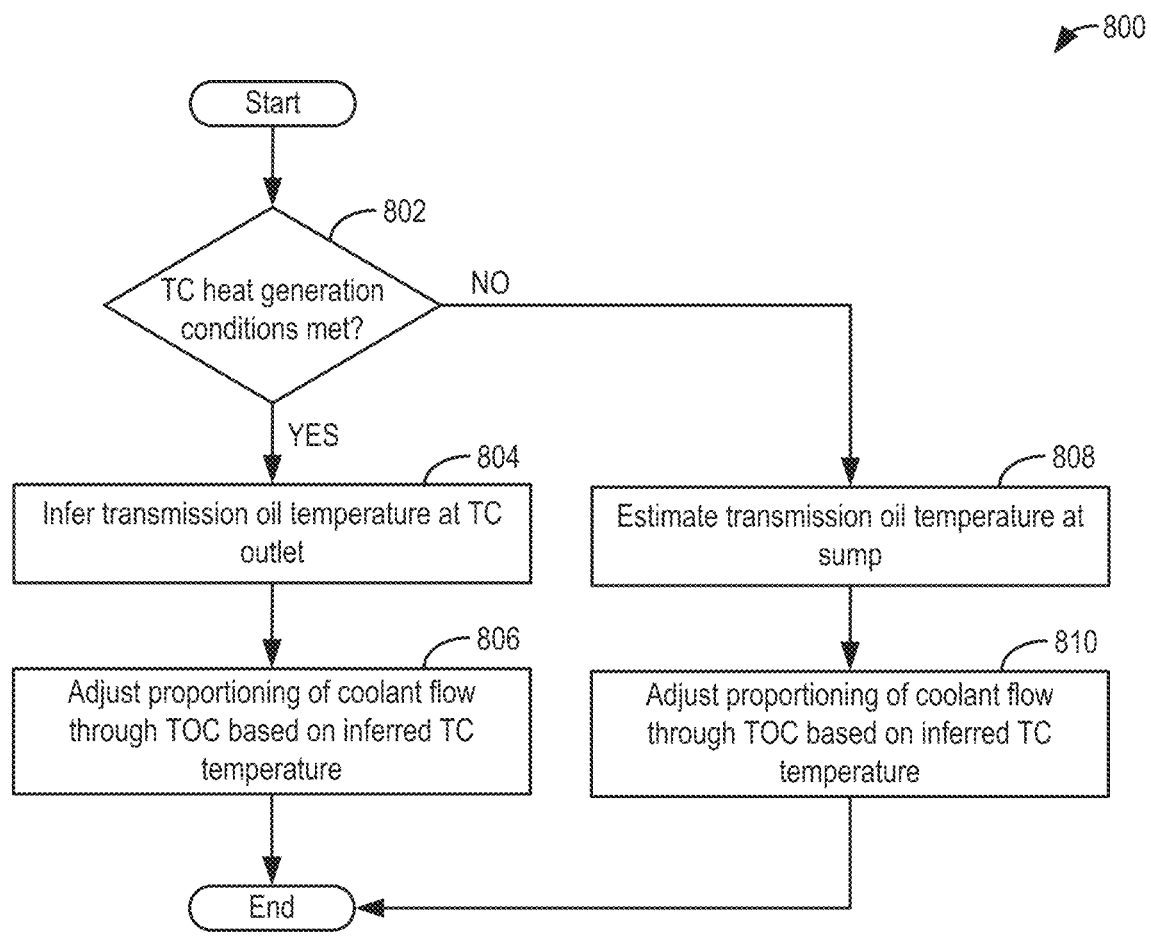
FIG. 8 shows a high level flow chart illustrating a routine that may be implemented for adjusting coolant flow through a TOC based on torque converter slip.

Turning now to FIG. 8, an example method 800 is shown for adjusting coolant flow through a TOC. The method improves transmission oil cooling and reduces the likelihood of coolant boiling. In one example, the method of FIG. 8 may be performed as part of the method of FIG. 5, such as at 506.

At 802, it may be determined if the conditions are met for generating excess heat at the torque converter. As such, the torque converter (TC) is a viscous coupling device that exchanges fluid inertia to transfer torque between the engine and the transmission. As a result, it can generate significant amounts of heat. During selected conditions, such as when the engine is being brake torqued (that is, both a brake pedal and an accelerator pedal are applied by an operator simultaneously), or when the vehicle is holding a grade with little to no vehicle speed (wherein the grade is being held because the operator accelerator pedal is applied), the TC may be slipping and may be unable to lock-up because of a lack of speed. During these conditions, the temperature of oil coming out of the TC may be significantly higher than that of the oil at the sump. In particular, the oil entering the TOC may be significantly higher than the sump temperature because of the long time constant associated with the whole mass of the transmission. If the coolant flow through the TOC is adjusted based on the TOT estimated at the sump, the provided coolant flow may be lower than the required coolant flow, causing coolant to boil over. In addition to degrading the transmission, the coolant boiling over can also cause degradation of all engine components sharing coolant with the transmission via the coolant loop, such as the AC system, the charge air cooler, the cylinder head, etc.

If the TC slip/heat generation conditions are confirmed, at 804, the transmission oil temperature at the TC outlet may be inferred. For example, the TC outlet temperature may be inferred based on the transmission sump temperature and the recent history of the transmission. Further, the TC outlet temperature may be determined based on torque converter slip ratio (output rpm relative to input rpm of TC). In addition, at 806, the proportioning of coolant flow through the TOC (relative to the AC and the CAC) may be adjusted based on the TC outlet temperature. The proportioning may be further adjusted based on a slip ratio across the TC and an engine speed. Since the TOC is in parallel to the AC and CAC proportioned branches, the maximum flow rate may be adjusted to be the greater of the flow to the TOC branch or the sum of the AC and CAC branches.

If the TC slip/heat generation conditions are not confirmed, at 808, the transmission oil temperature at the sump may be inferred and/or estimated and/or measured. For example, the TOT at the sump may be measured by a temperature sensor coupled to the sump. In addition, at 810, the proportioning of coolant flow through the TOC (relative to the AC and the CAC) may be adjusted based on the sump temperature. As an example, the vehicle may be stopped due to the brake being applied (brake torqueing) or the vehicle may be on a grade or towing a larger trailer, or there may be any other condition due to which the vehicle is otherwise resisted. While the vehicle is resisted, the driver may be demanding substantial torque or power and the transmission torque converter may be open, such that substantially all the power of the engine is generating heat. During these conditions, the CAC cooling load may be small and the AC cooling load may be small but the transmission cooling load may be high (e.g., higher than a limit, such as critically high). During these conditions, full pump cooling may be required. Even if the full pump cooling results in overcooling of the AC and the CAC with a small penalty on fuel efficiency, such penalties may be acceptable to provide the requested transmission cooling. In this way, adjusting the coolant distribution through a TOC based on torque converter conditions, including a TC slip ratio, coolant boiling may be better averted.

Turning now to FIGS. 9-12, example adjustments to the flow of coolant through distinct components of an engine coolant loop during different modes of operation of the coolant system.

Figure 9:
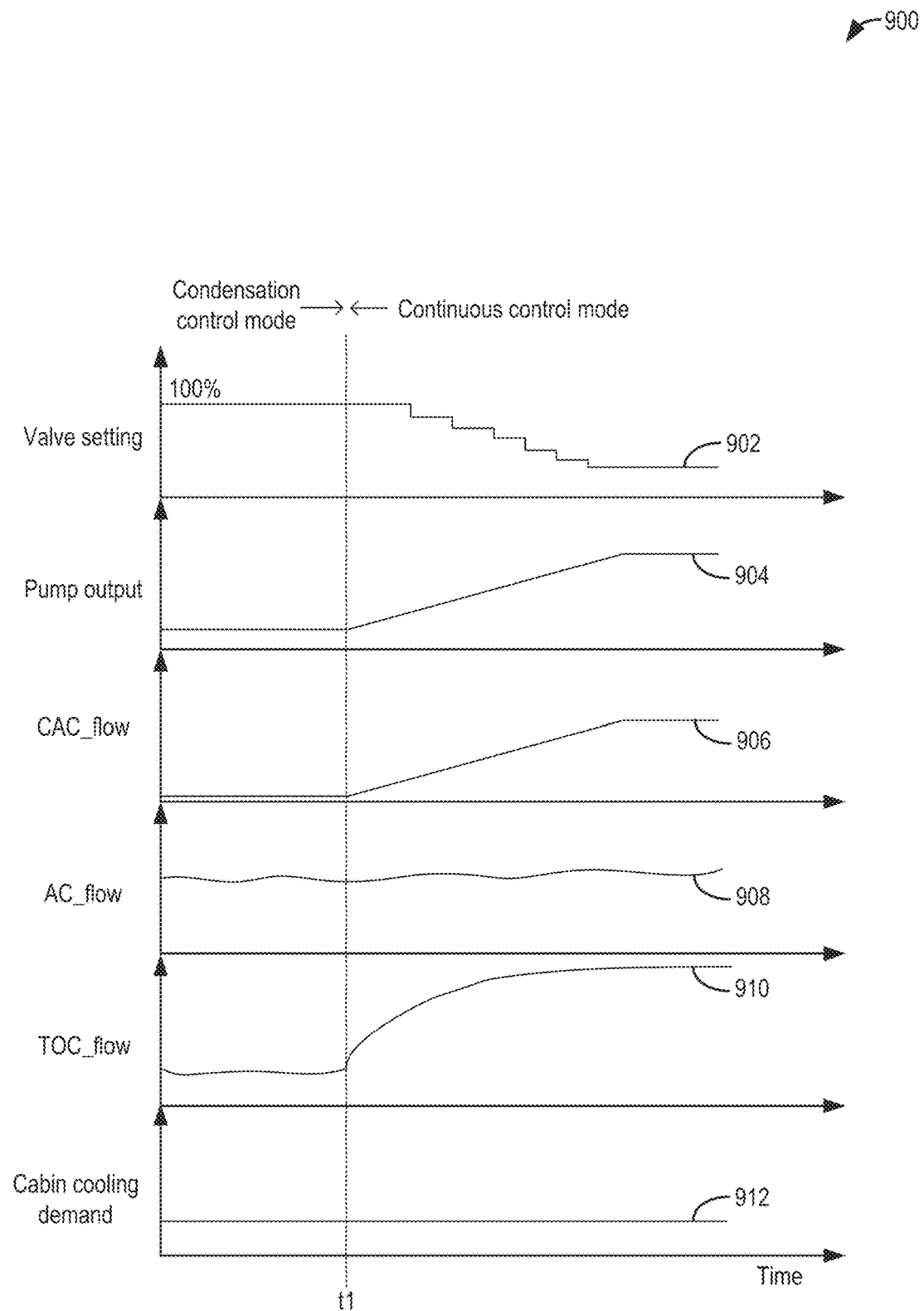
FIGS. 9-12 show example adjustments of coolant pump output and coolant flow apportioning between an AC and a charge air cooler of a coolant system responsive to change in cooling demands and engine operating conditions.

Turning first to FIG. 9, map 900 depicts an example transition from a condensation control mode of coolant system operation to a continuous control mode of coolant system operation. Map 900 depicts the setting of the proportioning valve at plot 902, coolant pump output at plot 904, coolant flow through the CAC loop (CAC_flow) at plot 906, coolant flow through the AC loop (AC_flow) at plot 908, coolant flow through the TOC (TOC_flow) at plot 910, and cabin cooling demand at plot 912. All plots are depicted over time.

Prior to t1, the coolant system is operating in the condensation control mode in response to certain intake air conditions, such as high humidity where condensation can form if the intake air in the CAC is overcooled. To reduce the side effects, such as water buildup and potential hardware damage issues, condensation control mode is used to minimize the coolant flow to the CAC. Therein the pump output and the valve setting is adjusted based on the higher cabin cooling demand and the lower CAC cooling demand. In the depicted example, the desired coolant flow rate is provided by operating the coolant pump with a lower output while setting the valve opening to 100% so that a larger portion of the coolant flow is directed through the AC loop.

At t1, in response to the conditions for condensation formation being no longer present, the coolant system is transitioned to the continuous control mode. Therein the pump output and the valve setting is adjusted based on the increase in CAC cooling demand at the same cabin cooling demand. In particular, the pump output is gradually raised while the valve setting is gradually lowered (herein stepwise) so that a calibrated portion of the coolant flow is through the AC loop and a remainder of the coolant flow is through the CAC loop. In one example, the valve setting is lowered from 100% to 45%. In this way, flow is diverted to both the CAC (e.g., 45%) and the AC (e.g., 55%). In an alternate example, the calibrated ratio may include 35% of the flow to the CAC and 65% of the flow to the AC. Still other calibrated ratios may be possible based on the make and model of the vehicle or the configuration of the coolant system. In another example, the positions and commands may be determined based on all the flow requirements of components and the inverse flow model described previously.

Figure 10:
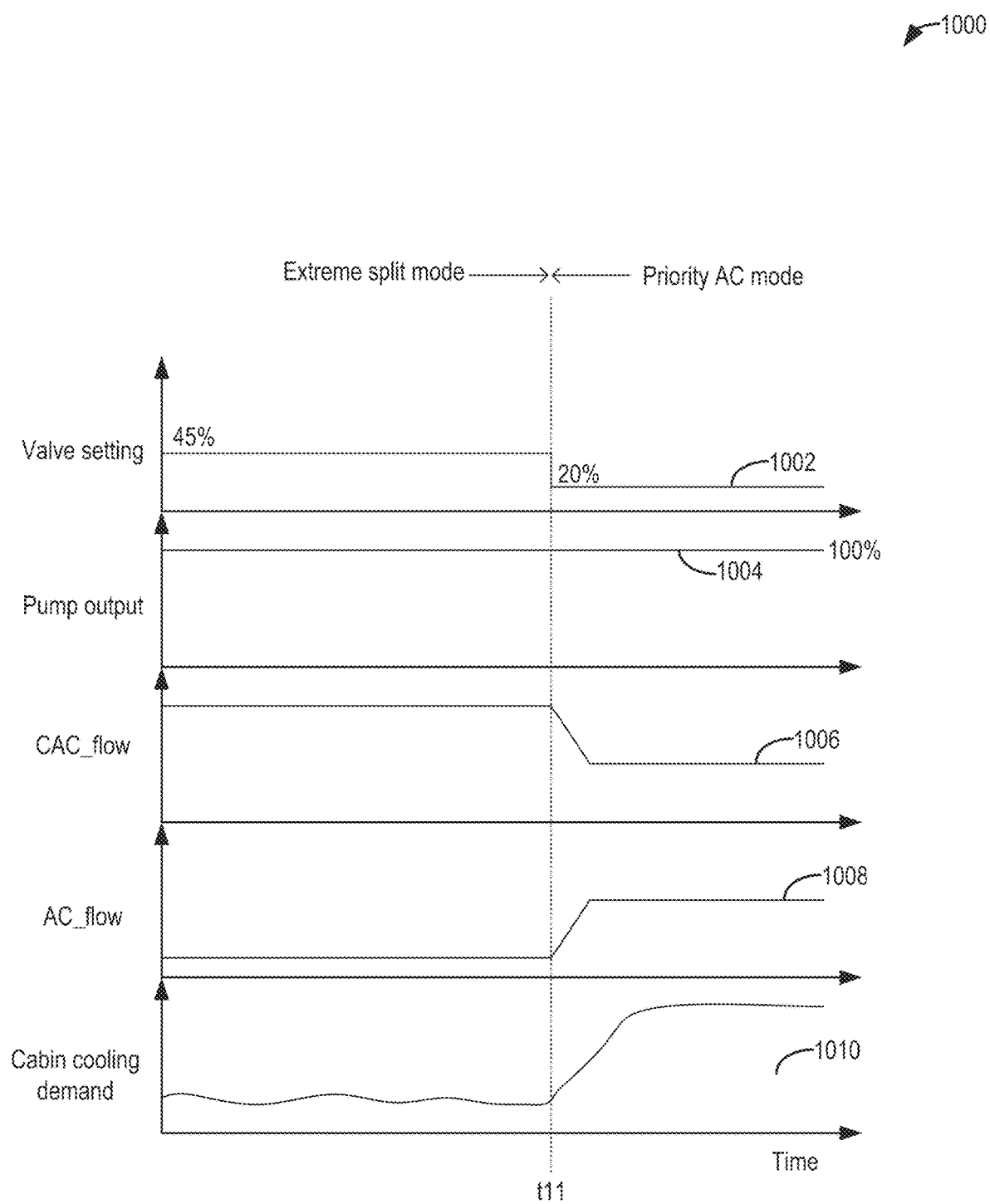

Turning now to FIG. 10, map 1000 depicts an example transition from an extreme split mode to a priority AC mode of coolant system operation. Map 1000 depicts the setting of the proportioning valve at plot 1002, coolant pump output at plot 1004, coolant flow through the CAC loop (CAC_flow) at plot 1006, coolant flow through the AC loop (AC_flow) at plot 1008, and cabin cooling demand at plot 1010. All plots are depicted over time.

Prior to t11, the coolant system is operating in the extreme split mode in response to cooling demanded at both the AC and CAC loops. Therein the pump output and the valve setting is adjusted to provide a calibrated ratio of coolant flow through both the AC and CAC loops. The calibrated ratio, in the depicted example, includes a valve setting of 45% opening that provides 45% of coolant flow through the CAC loop and 55% of coolant flow through the AC loop. Also in the extreme split mode, the pump output is set to 100% (maximum output). The 100% valve position refers to 100% flow to the CAC.

Figure 11:
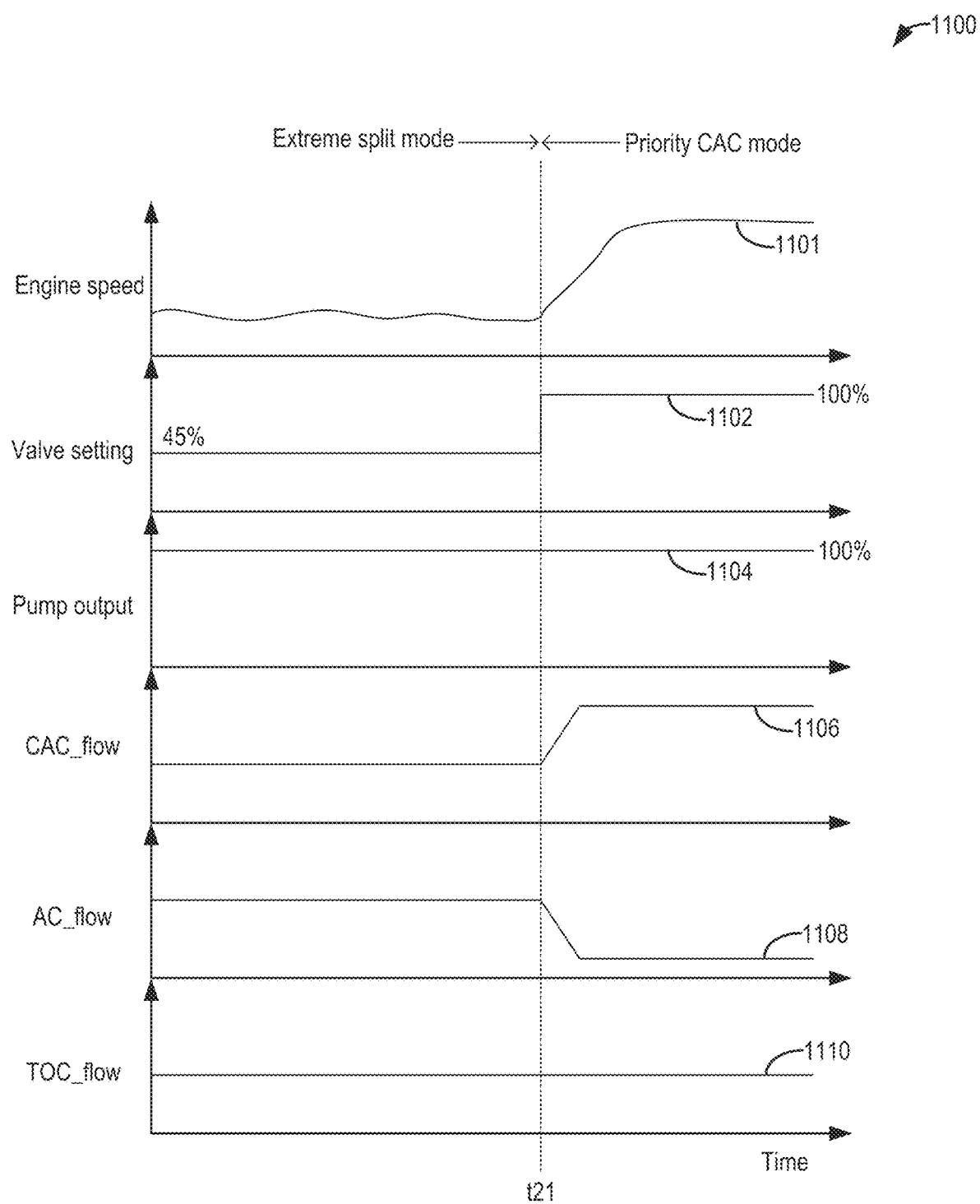

At t11, in response to an increase in cabin cooling demand, the coolant system is transitioned to the priority AC mode to prioritize coolant flow to the AC loop. Using the inverse model, the pump and valve settings are adjusted to provide the desired coolant flow through the AC loop. In particular, the pump output is maintained at 100% while the valve setting is lowered, in the depicted example from 45% to 20%, so that a larger portion of the coolant flow is directed through the AC loop and a smaller, remainder of the coolant flow is directed through the CAC loop. In this way, the cabin cooling demand from the customer from can be met. Turning now to FIG. 11, map 1100 depicts an example transition from the extreme split mode to a priority CAC mode of coolant system operation. Map 1100 depicts engine speed at plot 1101, the setting of the proportioning valve at plot 1102, coolant pump output at plot 1104, coolant flow through the CAC loop (CAC_flow) at plot 1106, coolant flow through the AC loop (AC_flow) at plot 1108, and coolant flow through the TOC (TOC_flow) at plot 1110. All plots are depicted over time.

Prior to t21, the coolant system is operating in the extreme split mode in response to high cooling demands at both the AC and CAC loops. Therein the pump output and the valve setting are adjusted to provide a calibrated ratio of coolant flow through both the AC and CAC loops. The calibrated ratio, in the depicted example, includes a valve setting of 45% opening that provides 45% of coolant flow through the CAC loop and 55% of coolant flow through the AC loop. Also in the extreme split mode, the pump output is set to 100% (maximum output).

At t21, in response to an increase in engine speed, the coolant system is transitioned to the priority CAC mode to prioritize coolant flow to the CAC loop. Herein 100% flow indicates priority of coolant flow to the CAC. The increase in engine speed may be responsive to an increased demand for boost pressure such as due to vehicle acceleration, a tip-in event, or an increase in driver demanded torque. Using the inverse model, the pump and valve settings are adjusted to provide the desired coolant flow through the CAC loop. In particular, the pump output is maintained at 100% while the valve setting is raised, in the depicted example from 45% to 100%, so that a larger portion of the coolant flow is directed through the CAC loop and a smaller, remainder of the coolant flow is directed through the AC loop. In this way, cooling requirements of the compressed intake air flowing through the CAC can be met.

Figure 12:
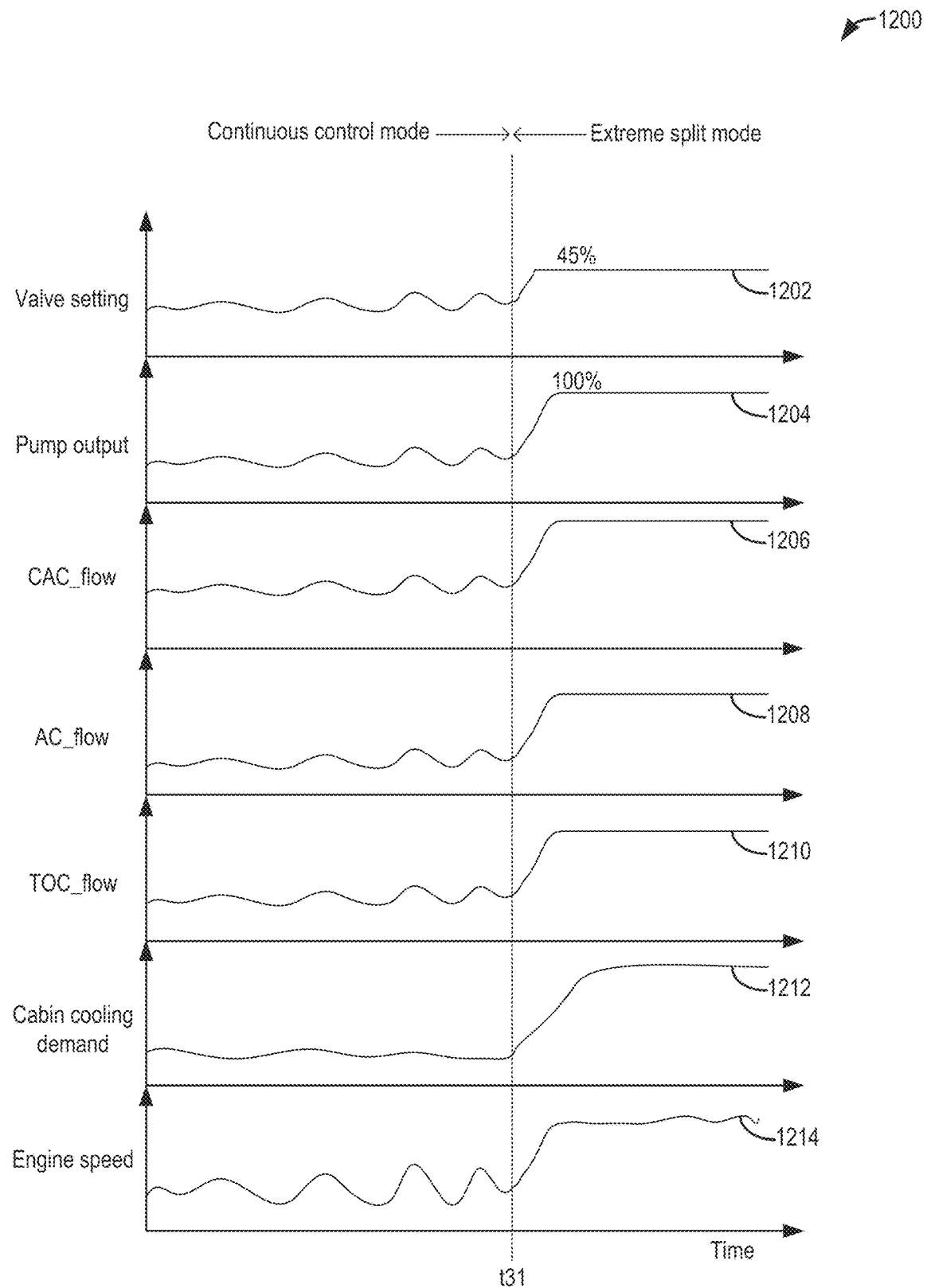

Turning first to FIG. 12, map 1200 depicts an example transition from a continuous control mode of coolant system operation to the extreme split mode of coolant system operation. Map 1200 depicts the setting of the proportioning valve at plot 1202, coolant pump output at plot 1204, coolant flow through the CAC loop (CAC flow) at plot 1206, coolant flow through the AC loop (AC_flow) at plot 1208, coolant flow through the TOC (TOC_flow) at plot 1210, cabin cooling demand at plot 1212, and engine speed at plot 1214. All plots are depicted over time.

Prior to t31, the coolant system is operating in the continuous control mode in response to less than maximum cooling demand at both the AC and CAC loops, and varying engine operating conditions. Therein the pump output and the valve setting is adjusted based on the varying cabin cooling demand and CAC cooling demand, wherein during some conditions the CAC cooling demand may be increasing while the AC cooling demand decreases, during other conditions the CAC cooling demand may be decreasing while the AC cooling demand increases, and during still other conditions, both the CAC cooling demand and the AC cooling demand may be increasing or decreasing (while staying below maximum limits). In the depicted example, the desired coolant flow rate is provided by operating the coolant pump with a continuously varying output (such as at or around 45%, e.g., between 25% and 45%) while also continuously varying the valve setting (such as at or around 45%, e.g., between 25% and 45%).

At t31, in response to an increase in both the cabin cooling demand and the engine speed, the coolant system is transitioned to the extreme split mode. The increase in engine speed may be responsive to an increased demand for boost pressure such as due to vehicle acceleration, a tip-in event, or an increase in driver demanded torque. The increase in cabin cooling demand may be responsive to an increase in ambient temperature. In particular, responsive to the increase in both the CAC and AC cooling demand, the pump output is raised while the valve setting is also changed and fixed, for example raised, so that a predefined calibrated portion of the coolant flow is through the AC loop. In the depicted example, the valve setting is raised to 45% while the pump output is raised to 100% (maximum output). In an alternate example, the value may be lowered. In this way, both the CAC and AC condenser cooling demands are met as best as possible. In this way, coolant may be flowed through each of a CAC, an AC condenser and a transmission oil cooler, with the flow apportioned based on cooling demands. By adjusting the flow responsive to AC head pressure (instead of temperature), a more prompt response to changes in cooling demand can be provided, improving cooling response times. In addition, changes between the actual AC head pressure and an expected pressure can be advantageously used to better estimate AC efficiency and stress. By using the same head pressure for AC clutch control, the need for additional sensors is reduced. By sharing the coolant between the various components requiring cooling, the need for additional radiators and fans is reduced, providing component reduction benefits. By adjusting the coolant distribution through a TOC based on torque converter conditions, including a TC slip ratio, coolant boiling may be better averted. In addition, the packaging space in the under-hood area is improved. Further, by improving the AC cooling through use of the coolant, the AC condenser may be moved away from a front end of the vehicle, reducing warranty issues. By correlating errors in AC head pressure with changes in AC compressor function, degradation of an AC system due to compressor issues may be better distinguished from those due to low refrigerant levels, allowing for appropriate mitigating actions to be performed. Overall, engine cooling performance for multiple coolant requiring components may be enhanced with an improvement in fuel economy.

One example method for operating a vehicle air conditioning system comprises: adjusting, via a pump and a proportioning valve coupled to each of a charge air cooler and an air conditioner condenser, a flow of coolant through the condenser in which refrigerant different from the coolant flows, the adjusting in response to a charge air cooler coolant temperature and an actual head pressure of an air conditioner compressor. In the preceding example, additionally or optionally, adjusting in response to the reference head pressure includes adjusting in response to a difference between the actual head pressure and a reference head pressure, the flow of coolant through the condenser increased as the actual head pressure exceeds the reference head pressure. In any or all of the preceding examples, additionally or optionally, the reference head pressure is modeled via a two-dimensional map, the map stored as a function of the coolant temperature and coolant flow rate. In any or all of the preceding examples, additionally or optionally, the actual head pressure includes a pressure at a location downstream of the AC compressor and upstream of each of an expansion valve and the condenser in a refrigerant circuit coupled to the AC system. In any or all of the preceding examples, additionally or optionally, the pump and the proportioning valve are selectively coupled to a coolant circuit of the AC system, each of the coolant circuit and the refrigerant circuit coupled to the condenser. In any or all of the preceding examples, additionally or optionally, the adjusting is further in response to a temperature of oil in a transmission cooler circuit, the transmission cooler circuit coupled to the coolant circuit at a transmission cooler, the transmission cooler located upstream of the proportioning valve and downstream of the pump, the transmission cooler further coupled to an engine coolant circuit distinct from the coolant circuit of the AC system. In any or all of the preceding examples, additionally or optionally, the adjusting includes, as the temperature of oil in the transmission cooler circuit increases, increasing an output of the pump to increase coolant flow to the condenser through the transmission cooler, wherein the increase in oil temperature is responsive to increased torque converter slip. In any or all of the preceding examples, additionally or optionally, the adjusting includes, for a given cabin cooling demand, maintaining or decreasing flow through the condenser while increasing flow through the charge air cooler as the charge air temperature increases, and increasing flow through the condenser while maintaining or decreasing flow through the charge air cooler as the actual head pressure exceeds a reference head pressure. In any or all of the preceding examples, additionally or optionally, the adjusting includes, responsive to each of the actual AC head pressure and the charge air temperature exceeding respective thresholds, increasing an output of the pump to an upper limit while setting the proportioning valve to a position that provides a calibrated fixed ratio of coolant flow through the condenser relative to the charge air cooler. In any or all of the preceding examples, additionally or optionally, the adjusting includes feed-forward selecting a pump and proportioning valve setting that provides a coolant flow rate determined as a function of the charge air cooler coolant temperature, and feedback adjusting the pump and proportioning valve setting based on an error between the actual head pressure and a reference head pressure, the reference head pressure determined as another function of the coolant temperature.

Another example method for a vehicle comprises: flowing refrigerant through a refrigerant circuit including an air-conditioning (AC) condenser; flowing coolant through a first branch of a coolant circuit including the condenser, and through a second branch of the coolant circuit including a charge air cooler (CAC), wherein coolant flow through the first branch relative to the second branch is adjusted based on an AC head pressure in the refrigerant circuit, a coolant temperature in the coolant circuit, and a CAC cooling demand. In any or all of the preceding examples, additionally or optionally, the first and second branch are located downstream of each of a coolant pump, and a proportioning valve, and wherein the first and second branch are parallel to a transmission oil cooler. In any or all of the preceding examples, additionally or optionally, coolant flow through the first branch relative to the second branch is adjusted via adjustments to a pump output and a position of the proportioning valve. In any or all of the preceding examples, additionally or optionally, the refrigerant circuit includes an AC compressor, a thermal expansion valve, an AC clutch, the condenser, and an AC evaporator, and wherein the head pressure in the refrigerant circuit is based on a position of the AC clutch, a temperature of the AC condenser, a position of the thermal expansion valve, and vehicle cabin cooling demand. In any or all of the preceding examples, additionally or optionally, the coolant flow through the first branch relative to the second branch is further based on a transmission oil temperature of oil circulating through the transmission oil cooler. In any or all of the preceding examples, additionally or optionally, the adjusting includes operating with an initial setting of the pump output and the proportional valve position based the coolant temperature, and then transitioning from the initial setting to a final setting of the pump output and the proportional valve position based on the AC head pressure relative to a reference AC head pressure, the reference AC head pressure modeled as a two-dimensional function of coolant temperature, coolant flow rate, and change in CAC cooling demand.

Another example vehicle system comprises: a vehicle cabin; an air conditioning (AC) system including an evaporator and a condenser for cooling cabin air; a boosted engine system including an engine, and a turbocharger compressor coupled upstream of a charge air cooler (CAC); a refrigerant circuit circulating refrigerant through the condenser, the circuit including a pressure sensor; a first coolant circuit circulating coolant through each of the condenser, the CAC, and a transmission oil cooler (TOC), the first coolant circuit including an electric pump, a proportioning valve, and a temperature sensor; and a second coolant circuit circulating coolant through each of the engine, an exhaust manifold cooler, and the TOC, the second coolant circuit including a mechanical pump. In any or all of the preceding examples, additionally or optionally, the refrigerant circuit is coupled to the first coolant circuit at the condenser, wherein the first coolant circuit is coupled to the second coolant circuit at the TOC, the TOC receiving oil from a torque converter outlet, and wherein the condenser is coupled to a first branch of the first coolant circuit downstream of the proportioning valve, and the CAC is coupled to a second branch of the first coolant circuit downstream of the proportioning valve, the first branch distinct from and parallel to the second branch. In any or all of the preceding examples, additionally or optionally, the system further comprises a controller with computer readable instructions stored on non-transitory memory for: selecting a mode of operation based on an AC cooling demand relative to a CAC cooling demand, the AC cooling demand based on operator requested cabin cooling, the CAC cooling demand based on operator requested torque; and responsive to the selected mode of operation, operating the pump with an output and the proportioning valve determined as a function of CAC cooling demand in the first coolant circuit and AC head pressure in the refrigerant circuit. In any or all of the preceding examples, additionally or optionally, the controller includes further instructions for: responsive to an increase in one of the AC cooling demand and the CAC cooling demand, increasing the pump output towards a threshold output and setting the proportioning valve to a position to provide a variable ratio of coolant flow through the first branch relative to the second branch that is a function of the AC cooling demand relative to the CAC cooling demand; and responsive to an increase in each of the AC cooling demand and the CAC cooling demand, increasing the pump output to the threshold output and setting the proportioning valve to a position to provide a fixed ratio of coolant flow through the first branch relative to the second branch.

An example method for operating a vehicle air conditioning system comprises: in response to each of a cabin cooling demand and a charge air cooler (CAC) cooling demand being higher than a threshold, adjusting coolant flow through each of an air-conditioning (AC) condenser and a charge air cooler (CAC) of a coolant circuit, in parallel, to meet the CAC cooling demand and cabin cooling demand, the coolant flow adjusted based on an AC head pressure and further based on CAC charge air outlet temperature. In any or all of the preceding examples, additionally or optionally, the adjusting includes adjusting the coolant flow via adjustments to a proportioning valve positioned upstream of each of the AC condenser and the CAC cooler. In any or all of the preceding examples, additionally or optionally, the adjusting further includes adjusting the coolant flow via adjustments to an output of a coolant pump pumping the coolant through each of the AC condenser, and CAC cooler via the proportioning valve. In any or all of the preceding examples, additionally or optionally, the adjusting is performed to maintain an AC head pressure of the AC condenser at a target pressure. In any or all of the preceding examples, additionally or optionally, a target coolant flow rate through the condenser is modeled via a two-dimensional map stored as a function of a CAC coolant temperature and the AC head pressure. In any or all of the preceding examples, additionally or optionally, the AC condenser is coupled to a refrigerant circuit including an AC compressor, an AC clutch, and a thermal expansion valve, and wherein the head pressure is estimated downstream of the AC compressor and upstream of the thermal expansion valve in the refrigerant circuit. In any or all of the preceding examples, additionally or optionally, the method further comprises: in response to the AC head pressure exceeding a threshold pressure, maintaining the AC clutch engaged and increasing the pump output; and in response to the AC head pressure continuing to exceed the threshold pressure after increasing the pump output, disengaging the AC clutch. In any or all of the preceding examples, additionally or optionally, the pump and the proportioning valve are selectively coupled to the coolant circuit and wherein each of the coolant circuit and the refrigerant circuit are coupled to the condenser. In any or all of the preceding examples, additionally or optionally, the coolant flow is further adjusted in response to a temperature of oil in a transmission cooler circuit, the transmission cooler circuit coupled to the coolant circuit at a transmission cooler, the transmission cooler located upstream of the proportioning valve and downstream of the pump. In any or all of the preceding examples, additionally or optionally, the adjusting includes, as the temperature of oil in the transmission cooler circuit increases, increasing an output of the pump, wherein the increase in oil temperature is responsive to increased torque converter slip.

Another example method comprises: during a first condition, when cooling demand at an air-conditioning (AC) condenser is lower than a lower threshold, adjusting an output of a coolant pump and a position of a proportioning valve of a coolant circuit to flow coolant through the condenser at a first, fixed flow rate while flowing coolant through a charge air cooler (CAC) at a second, variable flow rate that is based on CAC cooling demand; and during a second condition, when cooling demand at the condenser is higher than a higher threshold, adjusting the output of the coolant pump and the position of the proportioning valve to flow coolant through the CAC at a third, fixed flow rate while flowing coolant through the condenser at a fourth, variable flow rate that is based on cabin cooling demand. In any or all of the preceding examples, additionally or optionally, during the second condition, the output of the coolant pump is increased to an upper limit, and wherein during the first condition, the output of the coolant pump is lower than the upper limit. In any or all of the preceding examples, additionally or optionally, during the first condition, the second variable flow rate is mapped as a function of AC head pressure and coolant temperature and wherein during the second condition, the fourth variable flow rate is mapped as a function of AC head pressure and coolant temperature. In any or all of the preceding examples, additionally or optionally, the coolant circuit further includes a transmission oil cooler (TOC) parallel to the condenser and the CAC, each coupled to distinct branches of the coolant circuit downstream of the proportioning valve, the coolant circuit coupled to a refrigerant circuit at the condenser, the coolant circuit coupled to a transmission oil circuit at the TOC, and wherein the AC head pressure is estimated at the refrigerant circuit and the coolant temperature is estimated at the coolant circuit. In any or all of the preceding examples, additionally or optionally, during the first condition, the second variable flow rate is further adjusted based on a transmission oil temperature of the TOC and wherein during the second condition, the fourth variable flow rate is further adjusted based on the transmission oil temperature of the TOC. In any or all of the preceding examples, additionally or optionally, the transmission oil temperature is an estimated temperature estimated via a temperature sensor coupled to an oil sump when torque converter slip is lower, and wherein the transmission oil temperature is a modeled temperature modeled based on torque converter temperature change when torque converter slip is higher.

Another example vehicle system comprises: a vehicle cabin; an air conditioning (AC) system including an evaporator and condenser for cooling cabin air; a boosted engine system including an engine, and a turbocharger compressor coupled upstream of a charge air cooler (CAC); a refrigerant circuit circulating refrigerant through the condenser, the circuit including a pressure sensor; a first coolant circuit circulating coolant through each of the condenser, the CAC, and a transmission oil cooler (TOC), the first coolant circuit including an electric pump, a proportioning valve, and a temperature sensor; and a second coolant circuit circulating coolant through each of the engine, an exhaust manifold cooler, and the TOC, the second coolant circuit including a mechanical pump; and a controller including computer readable instructions for: in response to a cabin cooling demand, estimating a base coolant flow rate through the condenser based on coolant temperature; estimating a corrective coolant flow rate based on an actual AC head pressure relative to a reference AC head pressure, the reference AC head pressure determined as a function of the coolant temperature; adding the corrective coolant flow rate to the base coolant flow rate to determine a net coolant flow rate through the AC condenser; and actuating the pump and the proportioning valve to provide the net coolant flow rate through the AC condenser. In any or all of the preceding examples, additionally or optionally, the controller includes further instructions for: in response to no cabin cooling demand, estimating the base coolant flow rate through the condenser based on coolant temperature relative to ambient temperature; and actuating the pump and the proportioning valve to provide the base coolant flow rate through the AC condenser. In any or all of the preceding examples, additionally or optionally, the controller includes further instructions for: in response to a concurrent engine cooling demand, estimating a base coolant flow rate through the CAC based on coolant temperature; and adjusting an output of the pump and a position of the proportioning valve to provide the base coolant flow rate through the CAC while maintaining the net coolant flow rate through the AC condenser. In any or all of the preceding examples, additionally or optionally, the controller includes further instructions for: in response to each of the cabin cooling demand and the engine cooling demand exceeding a threshold, increasing the output of the pump to an upper limit and setting the position of the proportioning valve to a position that provides a fixed calibrated ratio of coolant flow through the condenser relative to the CAC, the fixed calibrated ratio independent of the AC cooling demand relative to the engine cooling demand.

An example method for a vehicle system comprises: estimating a requested coolant flow rate through a coolant circuit based on a cooling demand at each of an air-conditioning condenser, a charge air cooler (CAC) and a transmission oil cooler (TOC) of the coolant circuit; estimating an effective flow resistance through the coolant circuit based on a position of a first valve coupled to the condenser and the CAC, and a second valve coupled to the TOC; and adjusting a coolant pump output based on the estimated flow resistance to provide the requested coolant flow rate. In any or all of the preceding examples, additionally or optionally, the first valve is a three-way proportioning valve configured to apportion coolant between a first branch of the coolant circuit including the condenser, and a second branch of the cooling circuit including the CAC, the second branch arranged in parallel to the first branch. In any or all of the preceding examples, additionally or optionally, the second valve is coupled to a third branch of the coolant circuit including the TOC, the third branch parallel to, and bypassing, each of the first and the second branch. In any or all of the preceding examples, additionally or optionally, the coolant circuit is coupled to a transmission oil circuit at the TOC, the transmission oil circuit including a transmission torque converter, and wherein the coolant circuit is coupled to a refrigerant circuit of an air-conditioning system at the condenser. In any or all of the preceding examples, additionally or optionally, the method further comprises, opening the second valve in response to a higher than threshold transmission torque converter slip ratio and closing the second valve in response to a lower than threshold transmission torque converter slip ratio, wherein the effective flow resistance through the coolant circuit is higher when the second valve is closed, and the effective flow resistance is lower when the second valve is open. In any or all of the preceding examples, additionally or optionally, estimating the requested coolant flow rate includes mapping the coolant flow rate as a function of coolant temperature at an outlet of a low temperature radiator and an AC head pressure in the refrigerant circuit. In any or all of the preceding examples, additionally or optionally, adjusting the coolant pump output includes adjusting the coolant pump output between a lower limit and a higher limit, the lower limit enabling at least some coolant flow through the condenser in the absence cooling demand at the condenser. In any or all of the preceding examples, additionally or optionally, the method further comprises: assigning a priority status to one of first branch and the second branch based on the cooling demand at the condenser relative to the cooling demand at the CAC. In any or all of the preceding examples, additionally or optionally, the method further comprises, when the coolant pump output is at the lower limit, adjusting the first valve to provide a coolant flow that meets the cooling demand of one of the first branch and the second branch having higher priority status while diverting excess coolant flow to the other of the first branch and the second branch having lower priority status. In any or all of the preceding examples, additionally or optionally, the method further comprises, when the coolant pump output is at the higher limit, adjusting the first valve to provide a coolant flow that meets the cooling demand of one of the first branch and the second branch having higher priority status while diverting excess coolant flow to the other of the first branch and the second branch having lower priority status. In any or all of the preceding examples, additionally or optionally, the method further comprises, when the coolant pump output is at the higher limit, adjusting the first valve to provide a fixed ratio of coolant flow through the first branch and the second branch when the first branch and the second have equal priority status.

Another example method for a vehicle air-conditioning (AC) system comprises: estimating a cooling demand at each of an air-conditioning condenser and a charge air cooler (CAC) coupled to distinct branches of a coolant circuit; estimating an overall coolant flow rate through the coolant circuit and a ratio of coolant flow through the distinct branches based on the cooling demand; as the estimated cooling demand increases up to a limit, adjusting each of a coolant pump output and a position of a valve proportioning coolant flow between the distinct branches to vary the ratio as a function of AC head pressure and a proportion of flow demanded via the condenser relative to the CAC; and as the estimated cooling demand increases beyond the limit, operating the coolant pump at a maximal output and adjusting the position of the valve to maintain a predetermined ratio of coolant flow between the distinct branches. In any or all of the preceding examples, additionally or optionally, the valve is a three-way valve proportioning coolant flow between a first branch of the coolant circuit including the CAC, and a second branch of the cooling circuit including the condenser, the second branch arranged in parallel to the first branch. In any or all of the preceding examples, additionally or optionally, estimating the cooling demand includes estimating the cooling demand at the air-conditioning condenser based on each of operator cabin cooling demand, ambient temperature, and ambient humidity, and estimating the cooling demand at the CAC based on operator torque demand and manifold charge temperature. In any or all of the preceding examples, additionally or optionally, the AC condenser is further coupled to a refrigerant circuit different from the coolant circuit, the refrigerant circuit including a thermal expansion valve, an AC compressor, and an AC clutch, and wherein the AC head pressure is estimated at the refrigerant circuit. In any or all of the preceding examples, additionally or optionally, varying the ratio as a function of AC head pressure includes increasing the ratio of coolant flow through the second branch including the AC condenser as the AC head pressure estimated at the refrigerant circuit exceeds a reference AC head pressure, the reference AC head pressure mapped as a function of coolant flow rate and coolant temperature at an outlet of a low temperature radiator fluidically coupled to the CAC.

Another example vehicle system comprises: a vehicle cabin; an air conditioning (AC) system including a condenser for cooling cabin air; a boosted engine system including an engine, and a turbocharger compressor coupled upstream of a charge air cooler (CAC); a refrigerant circuit circulating refrigerant through the condenser, the circuit including a pressure sensor; a coolant circuit circulating coolant through each of the condenser, the CAC, and a transmission oil cooler (TOC), the coolant circuit including an electric pump, a proportioning valve, and a temperature sensor; and a controller including computer readable instructions for: mapping a target coolant flow rate through the condenser based on coolant temperature as a cabin cooling demand changes between a lower limit and an upper limit; adjusting an output of the pump based on the estimated coolant flow rate; and adjusting the position of the valve based on an actual AC head pressure estimated at the refrigerant circuit relative to a reference AC head pressure mapped based on the coolant temperature. In any or all of the preceding examples, additionally or optionally, the controller includes further instructions for: as the cabin cooling demand falls below the lower limit, adjusting the position of the valve to maintain a lower threshold coolant flow rate through the condenser; and as the cabin cooling demand exceeds the upper limit, adjusting the position of the valve to maintain the lower threshold coolant flow rate through the CAC. In any or all of the preceding examples, additionally or optionally, the controller includes further instructions for: in response to each of the cabin cooling and an engine cooling demand exceeding the upper limit, increasing the output of the pump while adjusting the position of the valve to maintain a fixed ratio of coolant flow rate through the condenser relative to the CAC. In any or all of the preceding examples, additionally or optionally, the controller includes further instructions for: mapping the target coolant flow rate through the condenser as a first function of the coolant temperature; and mapping the reference AC head pressure as a second, different function of the coolant temperature.

An example method for operating a vehicle air conditioning system, comprises: estimating a target coolant flow rate through a coolant circuit based on a cooling demand at each of an air-conditioning condenser, a charge air cooler (CAC) and a transmission oil cooler (TOC) of the coolant circuit; modeling a reference air-conditioning (AC) head pressure in a refrigerant circuit coupled to the condenser based on each of the target coolant flow rate and a coolant temperature; indicating degradation of the refrigerant circuit responsive to the reference AC head pressure relative to an actual AC head pressure; and in response to the indication, adjusting a ratio of coolant flow through the condenser relative to the CAC. In any or all of the preceding examples, additionally or optionally, the indicating includes indicating elevated condenser stress when the actual AC head pressure exceeds the reference AC head pressure. In any or all of the preceding examples, additionally or optionally, adjusting the ratio includes, responsive to the indication of elevated condenser stress, increasing coolant flow through the condenser. In any or all of the preceding examples, additionally or optionally, the method further comprises, when the actual AC head pressure is below the reference AC head pressure, integrating an error between the actual AC head pressure and the reference AC head pressure over a duration, and indicating degradation of the refrigerant circuit based on the integrated error. In any or all of the preceding examples, additionally or optionally, the indicating includes indicating refrigerant circuit obstruction when the integrated error is higher than a first threshold error and indicating refrigerant circuit leakage when the integrated error is higher than a second threshold error and lower than the first threshold error. In any or all of the preceding examples, additionally or optionally, adjusting the ratio includes, responsive to the indication of refrigerant circuit obstruction, decreasing coolant flow through the condenser while increasing coolant flow through the CAC, and responsive to the indication of refrigerant circuit leakage, increasing coolant flow through the condenser while maintaining or decreasing coolant flow through the CAC. In any or all of the preceding examples, additionally or optionally, the coolant circuit includes a first branch including the condenser, a second branch including the CAC, the second branch arranged in parallel to the first branch, and wherein increasing coolant flow through the condenser includes biasing a proportioning valve coupled upstream of the first and second branch towards the first branch, and wherein decreasing coolant flow through the condenser includes biasing the proportioning valve towards the second branch. In any or all of the preceding examples, additionally or optionally, the estimated target coolant flow rate is increased as one or more of the cooling demand of the air-conditioning condenser increases responsive to an operator cabin cooling demand, the cooling demand of the CAC increases responsive to an operator torque demand, and as the cooling demand of the TOC increases responsive to transmission torque converter slippage. In any or all of the preceding examples, additionally or optionally, the method further comprises, distinguishing refrigerant circuit degradation due to obstruction from degradation due to leakage based on a magnitude and direction of error between the reference AC head pressure and the actual AC head pressure. In any or all of the preceding examples, additionally or optionally, the coolant circuit is coupled to the refrigerant circuit at the condenser.

Another example method comprises: during a first condition, inferring a lower than threshold level of refrigerant at an AC refrigerant circuit based on an actual head pressure at an AC condenser being lower than an expected head pressure, the expected head pressure based on a flow rate and temperature of coolant flowing through a coolant circuit, distinct from the refrigerant circuit, coupled to the AC condenser; and during a second condition, inferring an obstruction in the AC refrigerant circuit based on an the actual head pressure at the AC condenser being lower than the expected head pressure. In any or all of the preceding examples, additionally or optionally, the expected head pressure based on the flow rate of coolant flowing through the coolant circuit includes based on the flow rate of coolant flowing through each of the condenser and a charge air cooler (CAC) in parallel, and further based on a coolant temperature at an outlet of a low temperature radiator fluidically coupled to the CAC. In any or all of the preceding examples, additionally or optionally, during the first condition, an integrated error between the actual head pressure and the expected head pressure, over a duration, is lower than a threshold, and during the second condition, the integrated error is higher than the threshold. In any or all of the preceding examples, additionally or optionally, the method further comprises, during the first condition, in response to the lower than threshold refrigerant level, increasing coolant flow through the condenser, and during the second condition, in response to the obstruction, decreasing coolant flow through the condenser. In any or all of the preceding examples, additionally or optionally, the method further comprises, during the first condition, setting a diagnostic code to request an operator to refill refrigerant, and during the second condition, setting a diagnostic code to request an operator to replace a refrigerant pipe. In any or all of the preceding examples, additionally or optionally, increasing coolant flow through the condenser includes adjusting a proportioning valve of the coolant circuit to bias coolant flow through the condenser, and wherein decreasing coolant flow through the condenser includes adjusting the proportioning valve to bias coolant flow through the CAC. In any or all of the preceding examples, additionally or optionally, the method further comprises, during a third condition, inferring elevated pumping work at the condenser based on an actual head pressure at the condenser being higher than the expected head pressure, and responsive to the inferring, increasing coolant flow through the condenser.

Another example vehicle system comprises: a vehicle cabin; an air conditioning (AC) system including an evaporator for cooling cabin air; a boosted engine system including an engine, and a turbocharger compressor coupled upstream of a charge air cooler (CAC); a refrigerant circuit circulating refrigerant through the condenser, the circuit including a pressure sensor; a coolant circuit circulating coolant through each of the condenser, the CAC, and a transmission oil cooler (TOC), the coolant circuit including an electric pump, a proportioning valve, and a temperature sensor; and a controller including computer readable instructions for: mapping each of a target coolant flow rate through the condenser and a reference AC head pressure at the refrigerant circuit based on coolant temperature as a cooling demand of coolant circuit components changes; adjusting an output of the pump based on the estimated coolant flow rate; indicating degradation of the refrigerant circuit based on an error between an actual head pressure and the reference head pressure; and adjusting a position of the valve based on the indication. In any or all of the preceding examples, additionally or optionally, the indicating includes: when the actual head pressure is higher than the reference head pressure, indicating condenser stress and biasing the valve position towards the condenser; when the actual head pressure is lower than the reference head pressure and an integrated error is smaller, indicating refrigerant line leakage and biasing the valve position towards the condenser; and when the actual head pressure is lower than the reference head pressure and the integrated error is larger, indicating refrigerant line obstruction and biasing the valve position towards the CAC. In any or all of the preceding examples, additionally or optionally, the controller includes further instructions for: mapping the target coolant flow rate through the condenser as a first function of the coolant temperature; and mapping the reference AC head pressure as a second, different function of the coolant temperature.

An example method comprises: adjusting flow of coolant through each of an air-conditioning condenser, a charge air cooler (CAC), and a transmission oil cooler (TOC) of a coolant circuit to maintain an estimated transmission oil temperature (TOT) below a threshold, the TOT estimated based on a torque converter slip ratio. In any or all of the preceding examples, additionally or optionally, the adjusting includes flowing coolant through the condenser, CAC, and TOT at a coolant flow rate mapped as a function of coolant temperature, AC head pressure, CAC cooling demand, and TOT. In any or all of the preceding examples, additionally or optionally, the adjusting includes adjusting an output of an electric coolant pump to flow coolant at the coolant flow rate. In any or all of the preceding examples, additionally or optionally, the proportioning valve is coupled upstream of a first branch of the coolant circuit including the condenser, and a second branch of the cooling circuit including the CAC, the second branch arranged in parallel to the first branch. In any or all of the preceding examples, additionally or optionally, the adjusting further includes adjusting the position of a proportioning valve configured to apportion coolant between the condenser and the CAC, the position of the proportioning valve biased towards the condenser in the first branch as a TOT cooling demand exceeds coolant flow required in the first and second branch. In any or all of the preceding examples, additionally or optionally, the TOC is coupled in a third branch of the coolant circuit, the third branch parallel to, and bypassing, each of the first and the second branch, the third branch including a one-way valve. In any or all of the preceding examples, additionally or optionally, the coolant circuit is coupled to a transmission oil circuit at the TOC, the transmission oil circuit including a transmission and a torque converter, and wherein the coolant circuit is coupled to a refrigerant circuit of an air-conditioning system at the condenser. In any or all of the preceding examples, additionally or optionally, the position of the proportioning valve is further adjusted based on an estimated AC head pressure, estimated at the refrigerant circuit, relative to a reference head pressure mapped based as a function of coolant temperature, the proportioning valve biased towards the condenser as the estimated AC head pressure exceeds the reference head pressure. In any or all of the preceding examples, additionally or optionally, the method further comprises in response to the estimated transmission oil temperature (TOT) exceeding the threshold, opening the one-way valve, and in response to the estimated transmission oil temperature (TOT) falling below the threshold, closing the one-way valve. In any or all of the preceding examples, additionally or optionally, the estimated transmission oil temperature is increased as the torque converter slip ratio increases.

Another example method for a vehicle system comprises: estimating a first transmission oil temperature of a transmission oil circuit via a temperature sensor; estimating a second transmission oil temperature of the transmission oil circuit as a function of a torque converter slip ratio; and adjusting coolant flow through a coolant circuit including a transmission oil cooler (TOC), an air-conditioning (AC) condenser, and a charge air cooler (CAC) based on a higher of the first and second transmission oil temperature. In any or all of the preceding examples, additionally or optionally, the first transmission oil temperature is indicative of oil temperature at an oil sump of the transmission oil circuit and wherein the second transmission oil temperature is indicative of oil temperature at an outlet of a torque converter of the transmission oil circuit. In any or all of the preceding examples, additionally or optionally, adjusting the coolant flow includes adjusting an output of an electric coolant pump of the coolant circuit to flow coolant at a target coolant flow rate, the target coolant flow rate mapped as a function of coolant temperature, AC head pressure, CAC cooling demand, and TOT. In any or all of the preceding examples, additionally or optionally, the transmission oil circuit is coupled to the coolant circuit at the TOC, the coolant circuit further coupled to a refrigerant circuit of an air-conditioning system at the condenser, wherein the AC head pressure is estimated at the refrigerant circuit. In any or all of the preceding examples, additionally or optionally, adjusting the coolant flow further includes adjusting the position of a proportioning valve configured to apportion coolant between the condenser and the CAC, the position of the proportioning valve biased towards one of the condenser and the CAC having lower cooling demand, wherein cooling demand at the condenser is based on cabin cooling demand and wherein cooling demand at the CAC is based on driver torque demand. In any or all of the preceding examples, additionally or optionally, the second transmission oil temperature is further estimated as a function of engine speed and the first transmission oil temperature, the estimated second transmission oil temperature increased as one or more of the engine speed, the torque converter slip ratio, and the estimated first transmission oil temperature increases.

Another example vehicle system comprises: a vehicle cabin; an air conditioning (AC) system including a condenser, evaporator, and compressor for cooling cabin air; a boosted engine system including an engine, and a turbocharger compressor coupled upstream of a charge air cooler (CAC); a refrigerant circuit circulating refrigerant through the condenser, the circuit including a pressure sensor; an oil circuit circulating oil drawn from a sump through each of a transmission, a torque converter, and a transmission oil cooler (TOC), the oil circuit including an oil temperature sensor and a transmission valve; a coolant circuit circulating coolant through each of the condenser, CAC, and TOC, the coolant circuit including an electric pump, a proportioning valve, and a coolant temperature sensor; and a controller including computer readable instructions for: when torque converter slip ratio is higher than a threshold, opening the transmission valve to circulate coolant through the TOC, and adjusting an output of the pump to provide a coolant flow rate through the TOC that is mapped as a function of a modeled transmission oil temperature; and when torque converter slip ratio is lower than the threshold, opening the transmission valve to circulate coolant through the TOC, and adjusting the output of the pump and the position of the proportioning valve to provide a coolant flow rate through the TOC that is mapped as a function of an estimated transmission oil temperature. In any or all of the preceding examples, additionally or optionally, the controller includes further instructions for: estimating the estimated transmission oil temperature via the oil temperature sensor; and modeling the modeled transmission oil temperature as a function of each of engine speed, torque converter slip ratio, and the estimated transmission oil temperature. In any or all of the preceding examples, additionally or optionally, the adjusting includes: as the estimated transmission oil temperature or the modeled transmission oil temperature exceeds a threshold temperature, increasing an output of the pump; biasing the proportioning valve towards the condenser when a CAC cooling demand exceeds a cabin cooling demand; and biasing the proportioning valve towards the CAC when the cabin cooling demand exceeds the CAC cooling demand. In any or all of the preceding examples, additionally or optionally, the controller includes further instructions for: closing the transmission valve to discontinue coolant flow through the TOC responsive to the estimated transmission oil temperature or the modeled transmission oil temperature falling below the threshold temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle air conditioning system, comprising:
with a controller, executing instructions stored on non-transitory memory to:
meet a cooling demand of each of a charge air cooler and an air conditioner condenser by adjusting, in parallel, via a pump and a proportioning valve, a flow of coolant through each of the charge air cooler (CAC) and the air conditioner condenser, the adjusting in response to a charge air cooler coolant temperature and an actual head pressure of an air conditioner compressor.

2. The method of claim 1, where the proportioning valve is a three-way valve, and wherein adjusting the flow of coolant through each of the charge air cooler and the air conditioner condenser includes adjusting the flow of coolant through a first branch of a coolant circuit including the air conditioner condenser, and a second branch of the cooling circuit including the CAC, the second branch arranged in parallel to the first branch.

3. The method of claim 2, wherein adjusting via the pump includes adjusting a pump output.

4. The method of claim 3, wherein the pump output is further adjusted based on a flow resistance through the coolant circuit, the flow resistance estimated by the controller based on each of a position of the proportioning valve and a position of another valve coupled to third branch of the coolant circuit including a transmission oil cooler (TOC), the third branch parallel to, and bypassing, each of the first and the second branch.

5. The method of claim 3, wherein adjusting via the pump includes adjusting the pump output between a lower limit and a higher limit, the lower limit enabling at least some coolant flow through the air conditioner condenser in the absence cooling demand at the air conditioner condenser.

6. The method of claim 5, further comprising, assigning a priority status to one of the first branch and the second branch based on the cooling demand at the air conditioner condenser relative to the cooling demand at the CAC, and wherein the adjusting includes, when the pump output is at the lower limit, adjusting the proportioning valve to provide coolant flow that meets the cooling demand of one of the first branch and the second branch having higher priority status while diverting excess coolant flow to the other of the first branch and the second branch having lower priority status.

7. The method of claim 1, wherein the adjusting in response to the actual head pressure includes adjusting in response to a difference between the actual head pressure and a reference head pressure, the flow of coolant through the air conditioner condenser increased as the actual head pressure exceeds the reference head pressure.

8. The method of claim 7, wherein the reference head pressure is modeled via a two-dimensional map, the map stored on the non-transitory memory as a function of the charge air cooler coolant temperature and a coolant flow rate.

9. The method of claim 4, wherein the adjusting is further in response to a temperature of oil in a transmission cooler circuit, the transmission cooler circuit coupled to the third branch of the coolant circuit at the TOC, wherein the adjusting includes, as the temperature of oil in the transmission cooler circuit increases, increasing an output of the pump to increase coolant flow to the air conditioner condenser through the transmission cooler.

10. The method of claim 9, wherein the increase in oil temperature at the TOC is responsive to increased torque converter slip.

11. The method of claim 1, wherein the adjusting includes, for a given cabin cooling demand, maintaining or decreasing flow through the air conditioner condenser while increasing flow through the charge air cooler as the charge air temperature increases, and increasing flow through the air conditioner condenser while maintaining or decreasing flow through the charge air cooler as the actual head pressure exceeds a reference head pressure.

12. The method of claim 1, wherein the adjusting includes, responsive to each of the actual AC head pressure and the charge air temperature exceeding respective thresholds, increasing an output of the pump to an upper limit while setting the proportioning valve to a position that provides a calibrated fixed ratio of coolant flow through the air conditioner condenser relative to the charge air cooler.

13. A method for a vehicle, comprising:
with a controller, executing instructions stored on non-transitory memory to:
flow refrigerant through a refrigerant circuit including an air-conditioning (AC) condenser;
flow coolant through each of a first branch of a coolant circuit including the condenser, a second branch of the coolant circuit including a charge air cooler (CAC), and a third branch including a transmission oil cooler, wherein coolant flow through the first branch relative to the second branch is adjusted based on an AC head pressure in the refrigerant circuit, a coolant temperature in the coolant circuit, a CAC cooling demand, and an estimated transmission oil temperature (TOT).

14. The method of claim 13, wherein the flowing is adjusted to meeting a cooling demand of each of the CAC and the AC condenser, and to maintain the estimated transmission oil temperature (TOT) below a threshold, the TOT estimated based on a torque converter slip ratio.

15. The method of claim 13, wherein the first and second branch are located downstream of each of a coolant pump, and a three-way proportioning valve, and wherein the first and second branch are parallel to the third branch.

16. The method of claim 15, wherein coolant flow through the first branch relative to the second branch relative is adjusted via adjustments to a pump output of the coolant pump and a position of the proportioning valve.

17. The method of claim 13, wherein the refrigerant circuit includes an AC compressor, a thermal expansion valve, an AC clutch, the AC condenser, and an AC evaporator, and wherein the head pressure in the refrigerant circuit is based on a position of the AC clutch, a temperature of the AC condenser, a position of the thermal expansion valve, and vehicle cabin cooling demand.

18. A vehicle system, comprising:
a vehicle cabin;
an air conditioning (AC) system including an evaporator and a condenser for cooling cabin air;
a boosted engine system including an engine, and a turbocharger compressor coupled upstream of a charge air cooler (CAC);
a refrigerant circuit circulating refrigerant through the condenser, the circuit including a pressure sensor;

a first coolant circuit circulating coolant through each of the condenser, the CAC, and a transmission oil cooler (TOC), the first coolant circuit including an electric pump, a three-way proportioning valve, and a coolant temperature sensor;

a second coolant circuit circulating coolant through each of the engine, an exhaust manifold cooler, and the TOC, the second coolant circuit including a mechanical pump; and an oil circuit circulating oil drawn from a sump through each of a transmission, a torque converter, and the TOC, the oil circuit including an oil temperature sensor and a transmission valve.

19. The system of claim 18, wherein the refrigerant circuit is coupled to the first coolant circuit at the condenser, wherein the first coolant circuit is coupled to the second coolant circuit at the TOC, the TOC receiving oil from a torque converter outlet, wherein the condenser is coupled to a first branch of the first coolant circuit downstream of the proportioning valve, the CAC is coupled to a second branch of the first coolant circuit downstream of the proportioning valve, the first branch distinct from and parallel to the second branch.

20. The system of claim 18, wherein the controller includes instructions stored on non-transitory memory that when executed cause the controller to:

responsive to a cabin cooling demand, adjust a coolant flow rate through the condenser via actuation of the pump and the proportioning valve, the coolant flow rate adjusted based on an actual AC head pressure relative to a reference AC head pressure, the reference AC head pressure determined as a function of sensed coolant temperature; and responsive to no cabin cooling demand, actuate the pump and the proportioning valve to provide a base coolant flow rate through the AC condenser, the base coolant flow rate through the condenser based on coolant temperature relative to ambient temperature.

* * * * *